(12) United States Patent
Primeaux et al.

(10) Patent No.: US 12,544,223 B2
(45) Date of Patent: Feb. 10, 2026

(54) VALVE LEAFLET RESECTION DEVICE

(71) Applicant: Medtronic, Inc., Minneapolis, MN (US)

(72) Inventors: Jonathan Primeaux, Santa Rosa, CA (US); Matthew Genovese, Windsor, CA (US); William Chang, Santa Rosa, CA (US)

(73) Assignee: Medtronic, Inc., Minneapolis, MN (US)

( * ) Notice: Subject to any disclaimer, the term of this patent is extended or adjusted under 35 U.S.C. 154(b) by 139 days.

(21) Appl. No.: 18/697,018

(22) PCT Filed: Sep. 29, 2022

(86) PCT No.: PCT/IB2022/059306
§ 371 (c)(1),
(2) Date: Mar. 29, 2024

(87) PCT Pub. No.: WO2023/053063
PCT Pub. Date: Apr. 6, 2023

(65) Prior Publication Data
US 2025/0032249 A1 Jan. 30, 2025

Related U.S. Application Data

(60) Provisional application No. 63/251,391, filed on Oct. 1, 2021.

(51) Int. Cl.
*A61B 17/295* (2006.01)
*A61B 17/29* (2006.01)
(Continued)

(52) U.S. Cl.
CPC .......... *A61F 2/2427* (2013.01); *A61B 17/295* (2013.01); *A61B 2017/00783* (2013.01);
(Continued)

(58) Field of Classification Search
CPC ........ A61B 17/320016; A61B 17/3201; A61B 17/295; A61B 2017/32004;
(Continued)

(56) References Cited

U.S. PATENT DOCUMENTS 4,655,216 A * 4/1987 Tischer .......... A61B 17/320016
600/564
5,558,644 A 9/1996 Boyd et al.
(Continued)

FOREIGN PATENT DOCUMENTS

EP 2368504 A1 9/2011

OTHER PUBLICATIONS

International Search Report and Written Opinion, International Application No. PCT/IB2022/059306, mailed Dec. 20, 2022, 13 pages.

*Primary Examiner* — Martin T Ton
(74) *Attorney, Agent, or Firm* — Medler Ferro Woodhouse & Mills PLLC

(57) ABSTRACT

A leaflet resection device includes a first jaw, a second jaw pivotably connected to the first jaw, a first linkage assembly coupled to the first jaw, and a second linkage assembly coupled to the second jaw. The second linkage assembly includes a first resection blade and a second resection blade that are configured to cut a leaflet of a native heart valve or a previously implanted valve prosthesis along a curved path when the first and second linkage assemblies are actuated.

20 Claims, 15 Drawing Sheets

FIG. 7B

(51) Int. Cl.
  *A61F 2/24*  (2006.01)
  *A61B 17/00* (2006.01)
  *A61F 2/95*  (2013.01)

(52) U.S. Cl.
  CPC ............... *A61B 2017/2947* (2013.01); *A61F 2002/9528* (2013.01)

(58) Field of Classification Search
  CPC ..... A61B 2017/2941; A61B 2017/2947; A61F 2/2427
  See application file for complete search history.

(56) References Cited

U.S. PATENT DOCUMENTS

| | | | |
|---|---|---|---|
| 5,964,758 A * | 10/1999 | Dresden | A61B 18/1445 606/45 |
| 6,743,230 B2 * | 6/2004 | Lutze | A61B 18/1445 606/205 |
| 2001/0037108 A1 | 11/2001 | Blocher et al. | |
| 2009/0209955 A1 | 8/2009 | Forster et al. | |
| 2012/0209305 A1 | 8/2012 | Deodhar et al. | |
| 2012/0271332 A1 * | 10/2012 | Kamel | A61B 17/295 606/159 |
| 2019/0298517 A1 | 10/2019 | Sanchez et al. | |
| 2020/0146690 A1 | 5/2020 | Rothstein et al. | |
| 2020/0146691 A1 | 5/2020 | Rothstein et al. | |
| 2023/0301784 A1 | 9/2023 | Walters et al. | |

* cited by examiner

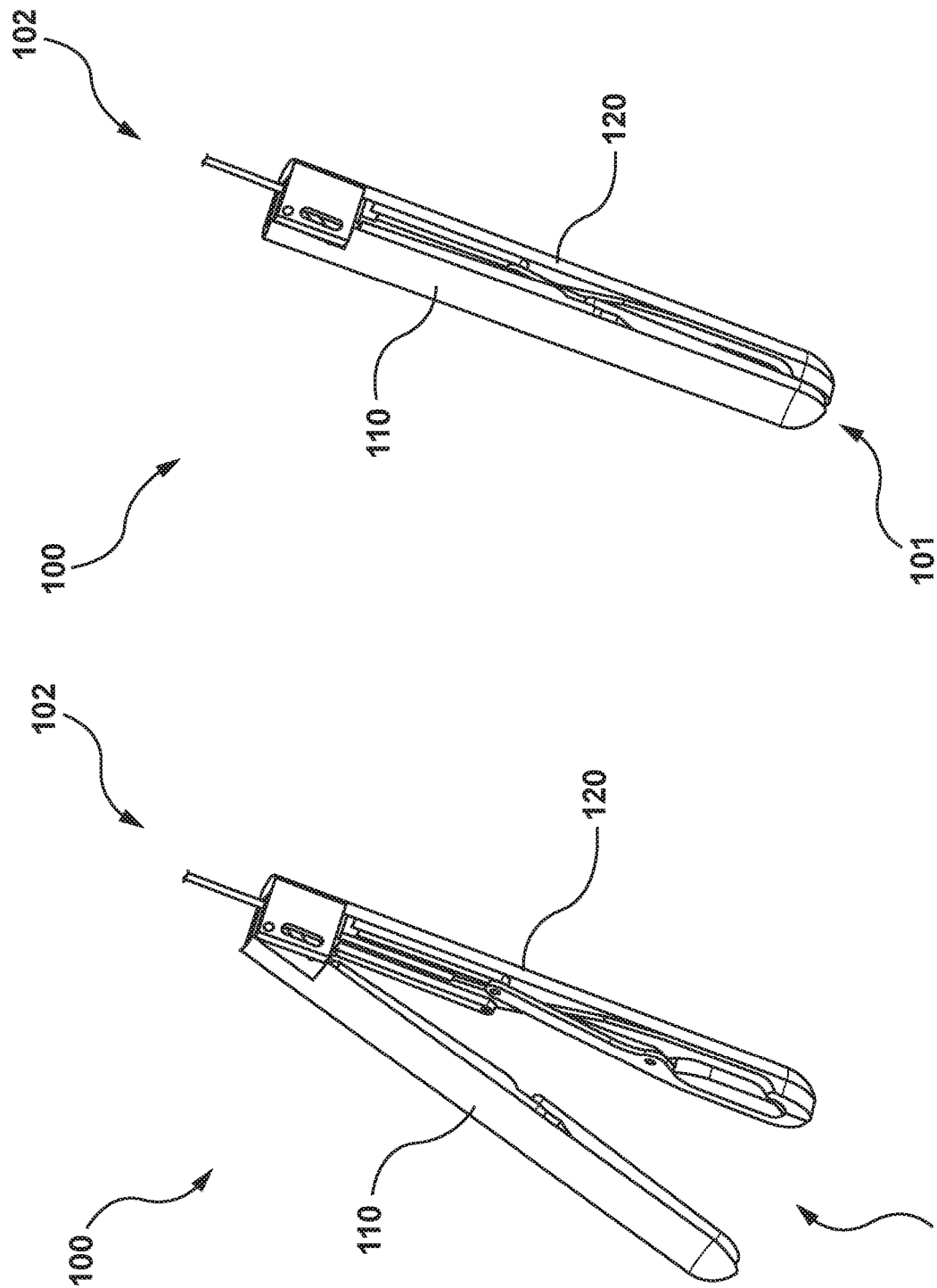

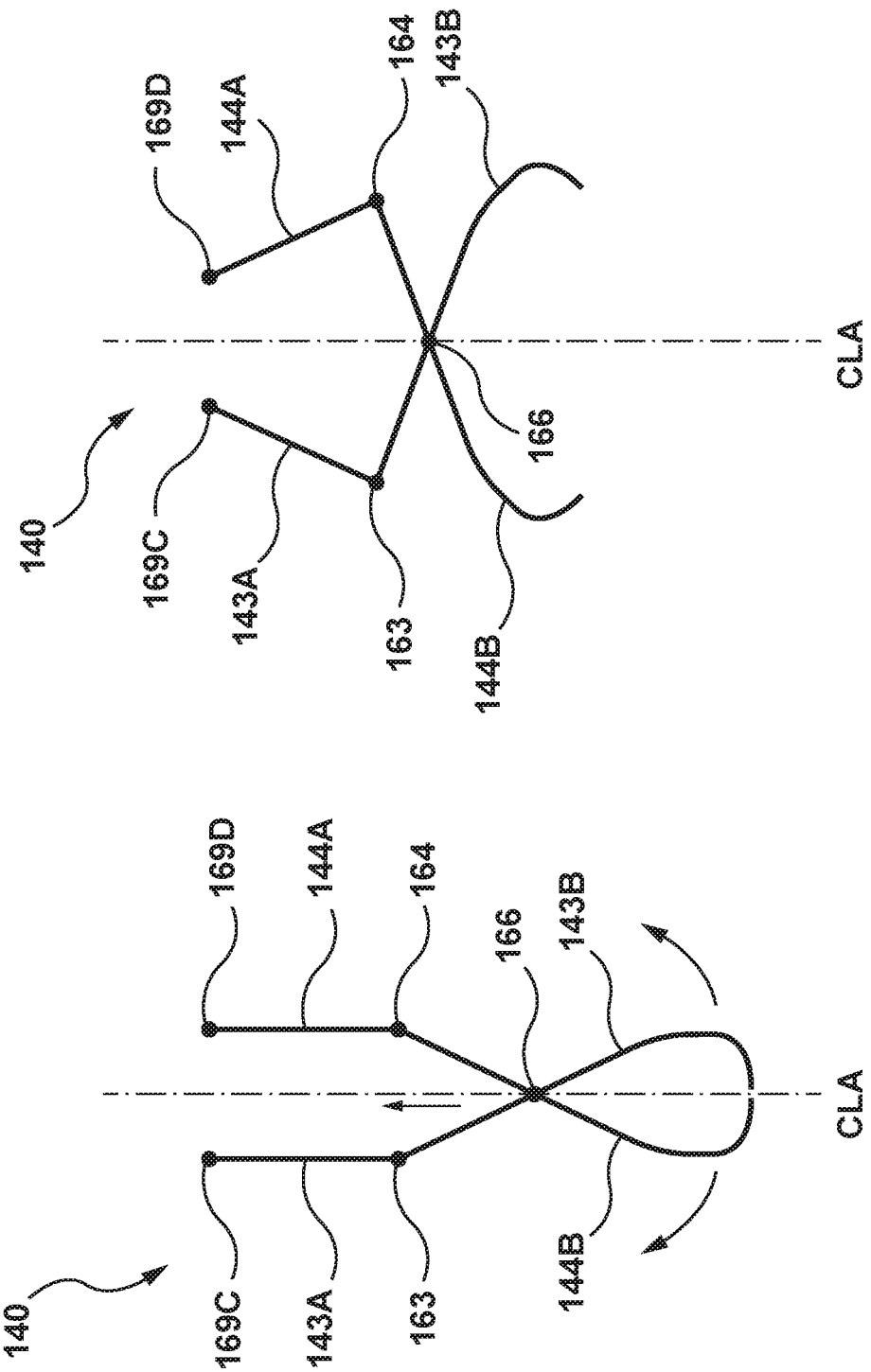

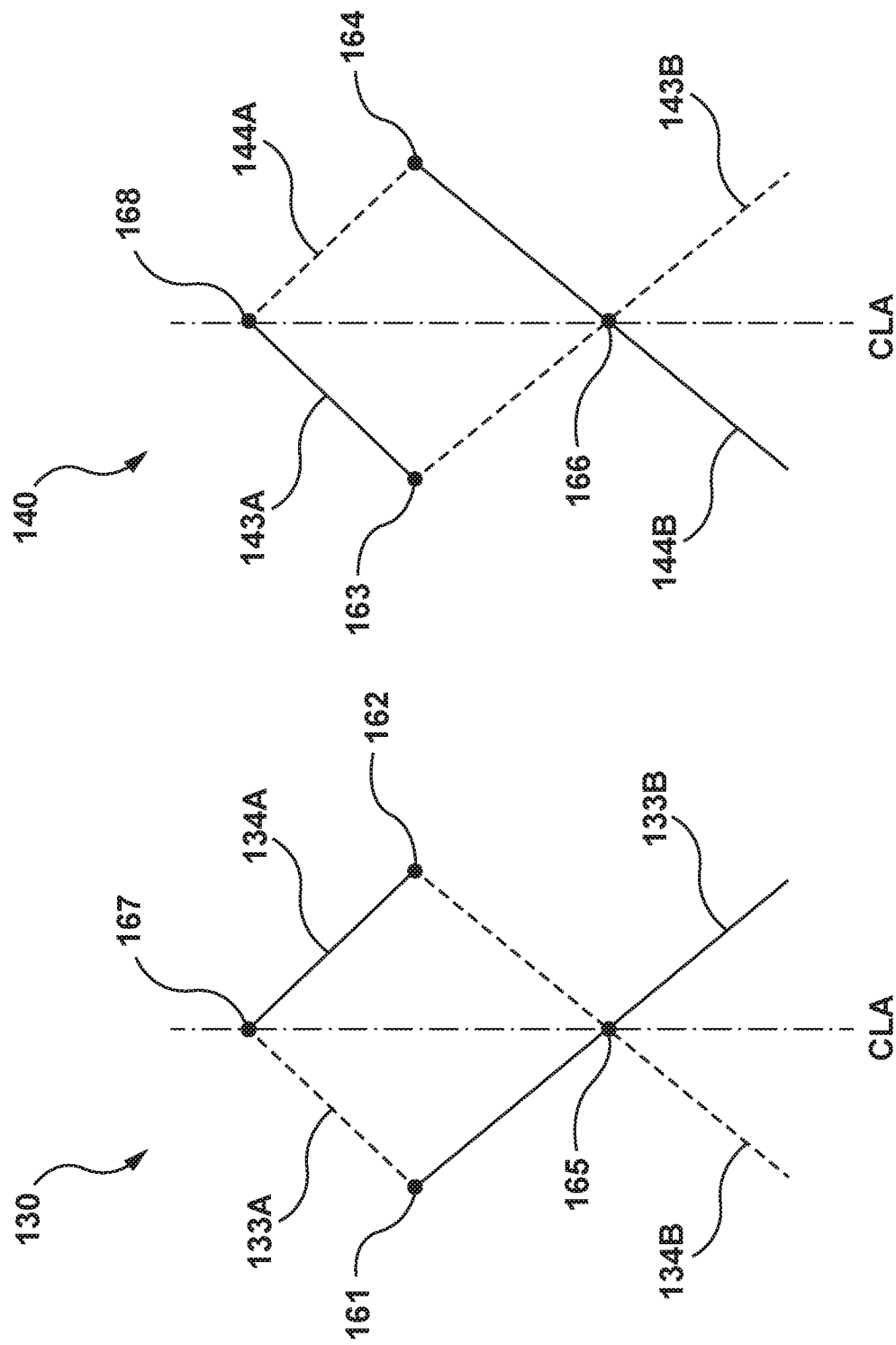

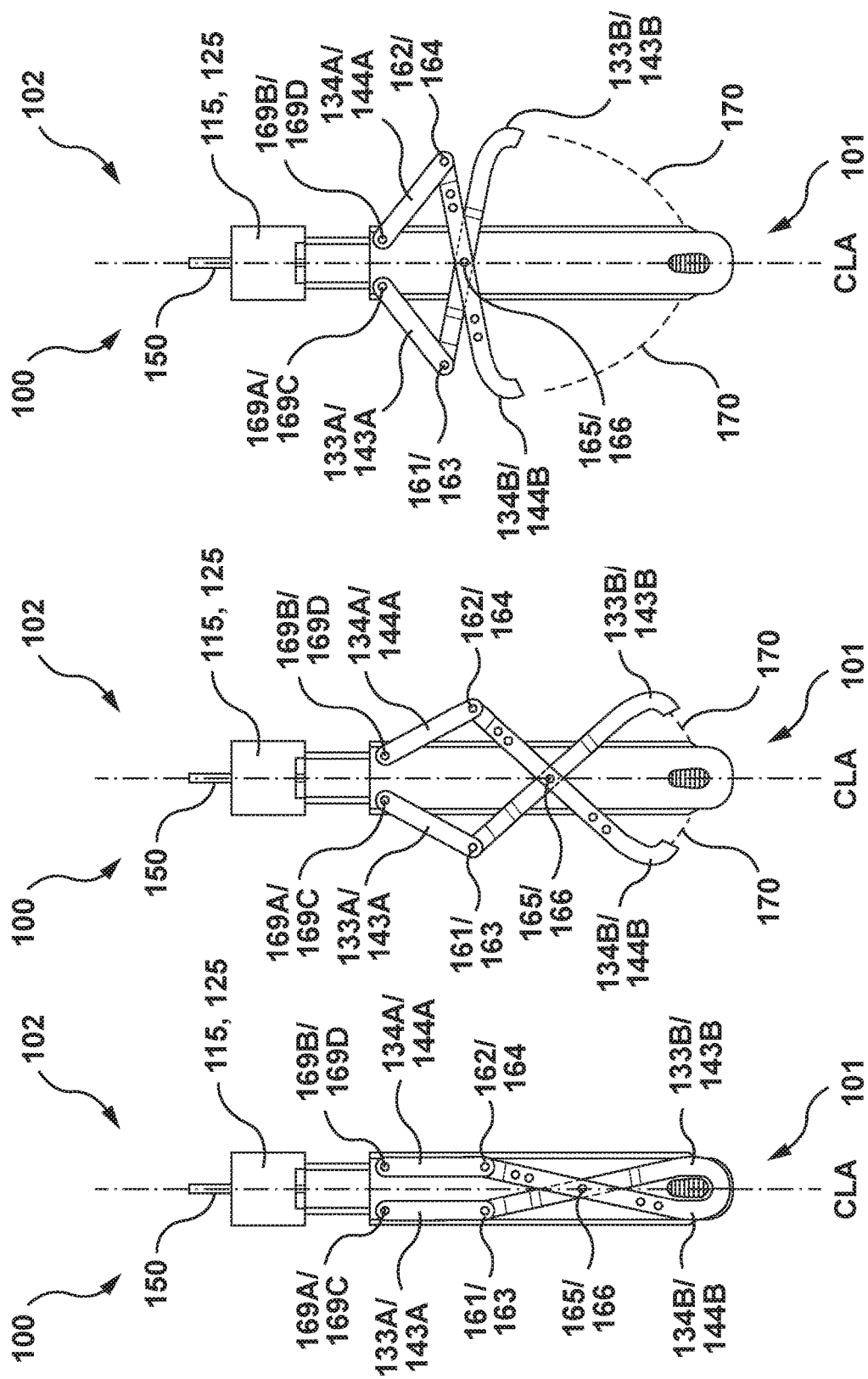

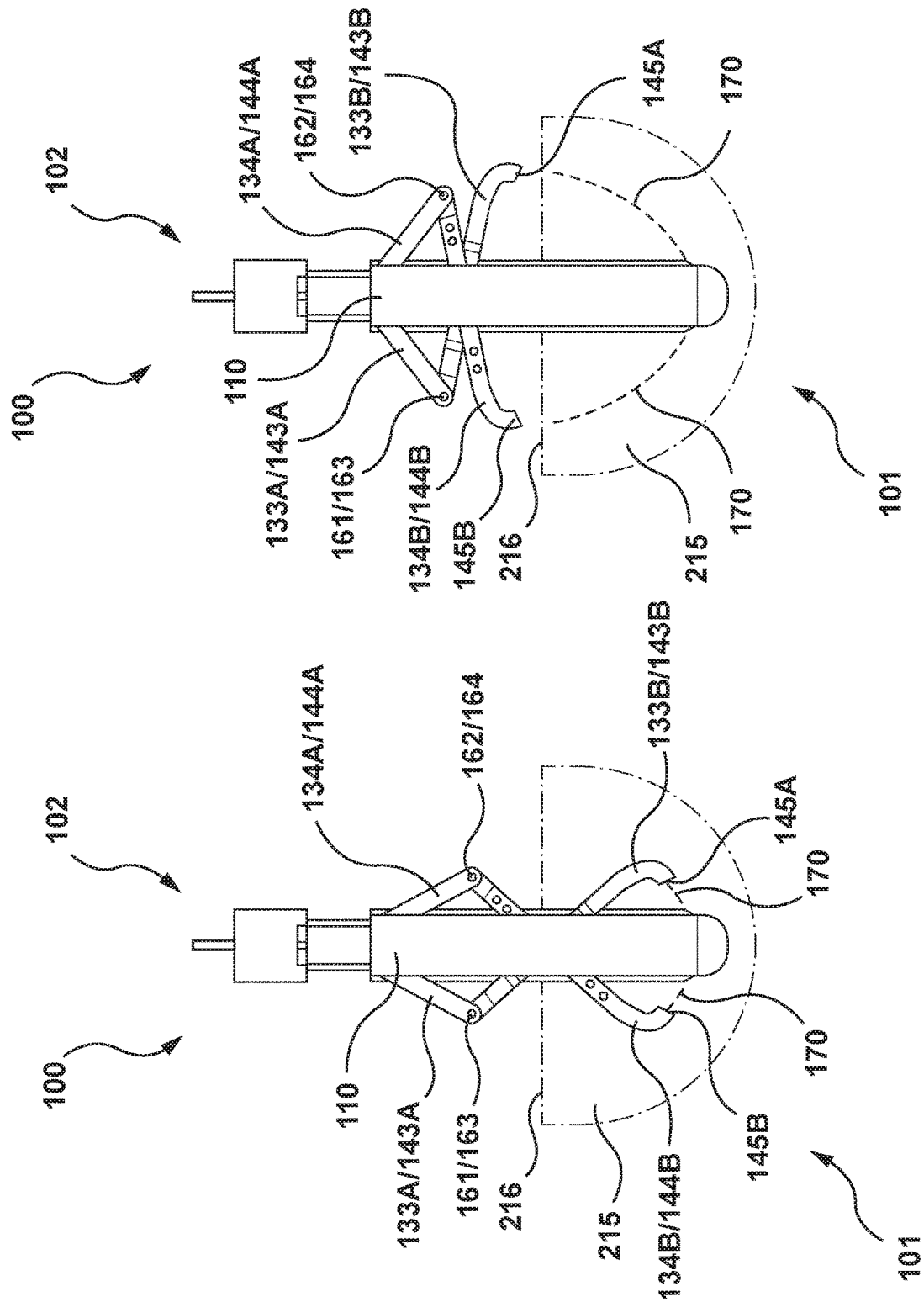

VALVE LEAFLET RESECTION DEVICE

FIELD OF THE INVENTION

The present invention relates to a valve leaflet resection device.

BACKGROUND

Deployment of a second transcatheter heart valve prosthesis within a previously implanted surgical or transcatheter heart valve prosthesis is referred to as a valve-in-valve procedure. At a native aortic valve, coronary artery obstruction may occur when leaflets of the first implanted valve (or the native valve) are displaced towards the coronary ostia or sinotubular junction during deployment of the second transcatheter valve deployment, thus obstructing coronary blood flow.

BRIEF SUMMARY OF THE INVENTION

In accordance with first aspect hereof, leaflet resection device having a central longitudinal axis includes a first jaw, a second jaw pivotably coupled to and opposing the first jaw, a first linkage assembly coupled to the first jaw, and an actuator coupled to the first linkage assembly. The first jaw and second jaws each include a distal end and a proximal end. The first linkage assembly includes: a first arm having a first proximal arm, a first distal arm, and a first pivot point pivotably coupling the first proximal arm and the first distal arm; a second arm having a second proximal arm, a second distal arm, and a second pivot point pivotably coupling the second proximal arm and the second distal arm, wherein the first and second distal arms cross and are pivotably connected a first distal pivot point distal of the first and second pivot points; a first resection blade coupled to a distal end of the first distal arm and extending towards the second jaw; and a second resection blade coupled to a distal end of the second distal arm and extending towards the second jaw. In a delivery configuration, the first linkage assembly is elongated such that the first and second arms are disposed laterally within the first jaw, and when actuated by the actuator, the first arm pivots about the first pivot point and the first distal pivot point, and the second arm pivots about the second pivot point and the first distal pivot point such that the distal ends of the first and second distal arms move along a curved path proximally and outwardly relative to the central longitudinal axis of the leaflet resection device.

In a second aspect of the invention, the leaflet resection device of any of the other aspects further includes a second linkage assembly coupled to the second jaw. The second linkage assembly includes: a third arm having a third proximal arm, a third distal arm, and a third pivot point pivotably coupling the third proximal arm and the third distal arm; and a fourth arm having a fourth proximal arm, a fourth distal arm, and a fourth pivot point pivotably coupling the fourth proximal arm and the fourth distal arm, wherein the third and fourth distal arms cross and are pivotably connected at a second distal pivot point distal of the third and fourth pivot points. In the delivery configuration, the second linkage assembly is elongated such that the third and fourth arms are disposed laterally within the second jaw, and when actuated, the third arm pivots about the third pivot point and the second distal pivot point, and the fourth arm pivots about the fourth pivot point and the second distal pivot point such that the distal ends of the third and fourth distal arms move along a curved path proximally and outwardly relative to the central longitudinal axis of the leaflet resection device.

In a third aspect of the invention, in the leaflet resection device of the second aspect, the first linkage assembly is actuated by the actuator, and the second linkage assembly is coupled to the first linkage assembly in a closed configuration of the leaflet resection device such that the second linkage assembly is actuated by the first linkage assembly.

In a fourth aspect of the invention, in the leaflet resection device of the second aspect or the third aspect, a distal end of the third distal arm of the second linkage assembly includes a slot configured to house a first tip of the first resection blade and a distal end of the fourth distal arm of the second linkage assembly includes a second slot configured to house a second tip of the second resection blade.

In a fifth aspect of the invention, in the leaflet resection device of anyone of the first through fourth aspects, the first jaw further includes a first protruding grip at the distal end of the first jaw and the second jaw further includes a second protruding grip at the distal end of the second jaw.

In a sixth aspect of the invention, in the leaflet resection device of anyone of the first through fifth aspects, the leaflet resection device includes an open configuration in which the first jaw and the second jaw are spaced apart from one another, and the closed configuration in which the first jaw are disposed adjacent to each other and substantially parallel to the central longitudinal axis of the leaflet resection device.

In a seventh aspect of the invention, in the leaflet resection device of anyone of the first through sixth aspects, the actuator includes a lead screw and a lead nut coupled to the lead screw, wherein rotation of the lead screw causes longitudinal translation of the lead nut, and wherein the lead nut is coupled to the first linkage assembly.

In an eighth aspect of the invention, in the leaflet resection device of anyone of the first through seventh aspects, the actuator is coupled to the first distal pivot point of the first linkage assembly such that actuation of the actuator longitudinally translates the first distal pivot point distally or proximally.

In a ninth aspect of the invention, in the leaflet resection device of anyone of the first through eighth aspects, a proximal end of the first proximal arm and a proximal end of the second proximal arm are rotatably coupled to the first jaw and longitudinally fixed relative to the first jaw.

In a tenth aspect of the invention, in the leaflet resection device of anyone of the first through eighth aspects, a proximal end of the first proximal arm is rotatably coupled to a proximal end of the second proximal arm, and wherein the proximal ends of the first and second proximal arms are rotatably coupled to the first jaw and longitudinally fixed relative to the first jaw.

In an eleventh aspect of the invention, in the leaflet resection device of anyone of the second through fourth aspects, a proximal end of the third proximal arm and a proximal end of the fourth proximal arm are rotatably coupled to the second jaw and longitudinally fixed relative to the second jaw.

In a twelfth aspect of the invention, in the leaflet resection device of the eleventh aspect, a proximal end of the first proximal arm and a proximal end of the second proximal arm are rotatably coupled to the first jaw and longitudinally fixed relative to the first jaw.

In a thirteenth aspect of the invention, in the leaflet resection device of anyone of the second through fourth aspects, a proximal end of the third proximal arm is rotatably coupled to a proximal end of the fourth proximal arm, and wherein the proximal ends of the first and second proximal arms are rotatably coupled to the second jaw and longitudinally fixed relative to the second jaw.

In a fourteenth aspect of the invention, in the leaflet resection device of the thirteenth aspect, a proximal end of the first proximal arm is rotatably coupled to a proximal end of the second proximal arm, and wherein the proximal ends of the first and second proximal arms are rotatably coupled to the first jaw and longitudinally fixed relative to the first jaw.

In a fifteenth aspect of the invention, in the leaflet resection device of anyone of the first through fourteenth aspects, the leaflet resection device is configured to resect at least 50% of a leaflet.

In a sixteenth aspect of the invention, in the leaflet resection device of anyone of the first through fourteenth aspects, the leaflet resection device is configured to resect at least 60%, or at least 70%, or at least 80% of a leaflet.

In a seventeenth aspect of the invention, a leaflet resection device having a central longitudinal axis includes a first jaw, a second jaw pivotably coupled to and opposing the first jaw, a first linkage assembly coupled to the first jaw, and an actuator coupled to the first linkage assembly. The first linkage assembly includes: a first arm having a first proximal arm, a first distal arm, and a first pivot point pivotably coupling the first proximal arm and the first distal arm; a second arm having a second proximal arm, a second distal arm, and a second pivot point pivotably coupling the second proximal arm and the second distal arm, wherein the first and second distal arms cross and are pivotably connected a first distal pivot point distal of the first and second pivot points; a first resection blade coupled to a distal end of the first distal arm and extending towards the second jaw; and a second resection blade coupled to a distal end of the second distal arm and extending towards the second jaw. The first jaw and the second jaw are configured to grasp a leaflet. With the leaflet grasped in the first and second jaws, the actuator is configured to move the first linkage such that the first and second resection blades move in a curved path to resect at least 50% of the leaflet.

In an eighteenth aspect of the invention, in the leaflet resection device of the seventeenth aspect, the leaflet resection device is configured to resect at least 60%, or at least 70%, or at least 80% of a leaflet.

In an nineteenth aspect of the invention, in the leaflet resection device of the seventeenth aspect or the eighteenth aspect, in a delivery configuration, the first linkage assembly is elongated such that the first and second arms are disposed laterally within the first jaw, and when actuated by the actuator, the first arm pivots about the first pivot point and the first distal pivot point, and the second arm pivots about the second pivot point and the first distal pivot point such that the distal ends of the first and second distal arms move along a curved path proximally and outwardly relative to the central longitudinal axis of the leaflet resection device.

In a twentieth aspect of the invention, the leaflet resection device of anyone of the seventeenth through nineteenth aspects further includes a second linkage assembly coupled to the second jaw. The second linkage assembly includes: a third arm having a third proximal arm, a third distal arm, and a third pivot point pivotably coupling the third proximal arm and the third distal arm; and a fourth arm having a fourth proximal arm, a fourth distal arm, and a fourth pivot point pivotably coupling the fourth proximal arm and the fourth distal arm, wherein the third and fourth distal arms cross and are pivotably connected at a second distal pivot point distal of the third and fourth pivot points. In the delivery configuration, the second linkage assembly is elongated such that the third and fourth arms are disposed laterally within the second jaw. When actuated, the third arm pivots about the third pivot point and the second distal pivot point, and the fourth arm pivots about the fourth pivot point and the second distal pivot point such that the distal ends of the third and fourth distal arms move along a curved path proximally and outwardly relative to the central longitudinal axis of the leaflet resection device.

In a twenty-first aspect of the invention, in the leaflet resection device of the twentieth aspect, the first linkage assembly is actuated by the actuator, and wherein the second linkage assembly is coupled to the first linkage assembly in a closed configuration of the leaflet resection device such that the second linkage assembly is actuated by the first linkage assembly.

In a twenty-second aspect of the invention, in the leaflet resection device of the twentieth aspect or twenty-first aspect, a distal end of the third distal arm of the second linkage assembly includes a slot configured to house a first tip of the first resection blade and a distal end of the fourth distal arm of the second linkage assembly includes a second slot configured to house a second tip of the second resection blade.

In a twenty-third aspect of the invention, in the leaflet resection device of anyone of the seventeenth through twenty-second aspects, the first jaw further includes a first protruding grip at the distal end of the first jaw and the second jaw further includes a second protruding grip at the distal end of the second jaw.

In a twenty-fourth aspect of the invention, in the leaflet resection device of anyone of the seventeenth through twenty-third aspects, the leaflet resection device includes an open configuration in which the first jaw and the second jaw are spaced apart from one another, and the closed configuration in which the first jaw are disposed adjacent to each other and substantially parallel to the central longitudinal axis of the leaflet resection device.

In a twenty-fifth aspect of the invention, in the leaflet resection device of anyone of the seventeenth through twenty-fourth aspects, the actuator includes a lead screw and a lead nut coupled to the lead screw, wherein rotation of the lead screw causes longitudinal translation of the lead nut, and wherein the lead nut is coupled to the first linkage assembly.

In a twenty-sixth aspect of the invention, in the leaflet resection device of anyone of the seventeenth through twenty-fifth aspects, the actuator is coupled to the first distal pivot point of the first linkage assembly such that actuation of the actuator longitudinally translates the first distal pivot point distally or proximally.

In a twenty-seventh aspect of the invention, in the leaflet resection device of anyone of the seventeenth through twenty-sixth aspects, a proximal end of the first proximal arm and a proximal end of the second proximal arm are rotatably coupled to the first jaw and longitudinally fixed relative to the first jaw.

In a twenty-eighth aspect of the invention, in the leaflet resection device of anyone of the seventeenth through twenty-sixth aspects, a proximal end of the first proximal arm is rotatably coupled to a proximal end of the second proximal arm, and wherein the proximal ends of the first and second proximal arms are rotatably coupled to the first jaw and longitudinally fixed relative to the first jaw.

In a twenty-ninth aspect of the invention, in the leaflet resection device of anyone of the twentieth through twenty-second aspects, a proximal end of the third proximal arm and a proximal end of the fourth proximal arm are rotatably coupled to the second jaw and longitudinally fixed relative to the second jaw.

In a thirtieth aspect of the invention, in the leaflet resection device of the twenty-ninth aspect, a proximal end of the first proximal arm and a proximal end of the second proximal arm are rotatably coupled to the first jaw and longitudinally fixed relative to the first jaw.

In a thirty-first aspect of the invention, in the leaflet resection device of anyone of the twentieth through twenty-second aspects, a proximal end of the third proximal arm is rotatably coupled to a proximal end of the fourth proximal arm, and wherein the proximal ends of the first and second proximal arms are rotatably coupled to the second jaw and longitudinally fixed relative to the second jaw.

In a thirty-second aspect of the invention, in the leaflet resection device of the thirty-first aspect, a proximal end of the first proximal arm is rotatably coupled to a proximal end of the second proximal arm, and wherein the proximal ends of the first and second proximal arms are rotatably coupled to the first jaw and longitudinally fixed relative to the first jaw.

In a thirty-third aspect of the invention, a method of resecting a leaflet using a leaflet resection device includes: tracking a leaflet resection device in a closed configuration to a valve of interest within the patient, the valve including at least one leaflet; positioning the leaflet resection device adjacent the leaflet of the valve; advancing the leaflet resection device in an open configuration such that the leaflet is disposed between a first jaw and a second jaw of the leaflet resection device; closing the leaflet resection device such that the leaflet is grasped by the first and second jaws; actuating the leaflet resection device such that a first resection blade moves from a distal end of the leaflet resection device adjacent a central longitudinal axis of the leaflet resection device along a first curved path proximally and outwardly to a first side relative to the central longitudinal axis and a second resection blade moves from a distal end of the leaflet resection device adjacent the central longitudinal axis along a second curved path proximally and outwardly to a second side relative to the central longitudinal axis.

In a thirty-fourth aspect of the invention, the method of the thirty-third aspect further includes retracting the leaflet resection device with the resected leaflet between the first and second jaws into a sheath.

In a thirty-fifth aspect of the invention, in the method of the thirty-third aspect or the thirty-fourth aspect, the valve of interest is a native heart valve.

In a thirty-sixth aspect of the invention, in the method of the thirty-third aspect or the thirty-fourth aspect, the valve of interest is a prosthetic valve of a previously implanted valve prosthesis.

In a thirty-seventh aspect of the invention, in the method of anyone of the thirty-third aspect through the thirty-sixth aspects, the leaflet resection device is configured to resect at least 50% of the leaflet.

In a thirty-eighth aspect of the invention, in the method of anyone of the thirty-third aspect through the thirty-sixth aspects, the leaflet resection device is configured to resect at least 60%, or at least 70%, or at least 80% of the leaflet.

In a thirty-ninth aspect of the invention, in the method of anyone of the thirty-third aspect through the thirty-eighth aspects, the leaflet resection device is configured to resect a semicircular-shaped portion of the leaflet.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

The foregoing and other features and advantages of the present disclosure will be apparent from the following description of embodiments hereof as illustrated in the accompanying drawings. The accompanying drawings, which are incorporated herein and form a part of the specification, further serve to explain the principles of the present disclosure and to enable a person skilled in the pertinent art to make and use the embodiments of the present disclosure. The drawings may not be to scale.

FIG. 4A shows a perspective side view of the leaflet resection device of FIG. 2A in an open configuration.

FIG. 4B shows a perspective side view of the leaflet resection device of FIG. 2A in a closed configuration.

FIGS. 5C-5D show schematic illustrations of actuation of the second linkage assembly of FIG. 5B.

FIG. 6A shows a schematic illustration of a first linkage assembly according to an embodiment hereof.

FIG. 6B shows a schematic illustration of a second linkage assembly corresponding to the first linkage assembly embodiment in FIG. 6A.

FIG. 8A shows a top view of a leaflet resection device when the first and second linkage assemblies are in the tracking position according to an embodiment hereof.

FIG. 8B shows a top view of the leaflet resection device of FIG. 8A when the first and second linkage assemblies are transitioning from the tracking position to the complete resection position.

FIG. 8C shows a top view of the leaflet resection device of FIG. 8B when the first and second linkage assemblies are in the complete resection position.

FIG. 10E shows a step in the method of FIG. 9, showing a top view of the first and second linkage assemblies cutting through a leaflet while the leaflet resection device is in a closed configuration.

FIG. 10F shows a step in the method of FIG. 9, showing a top view of the first and second linkage assemblies in the complete resection position.

DETAILED DESCRIPTION

Figure 1B:
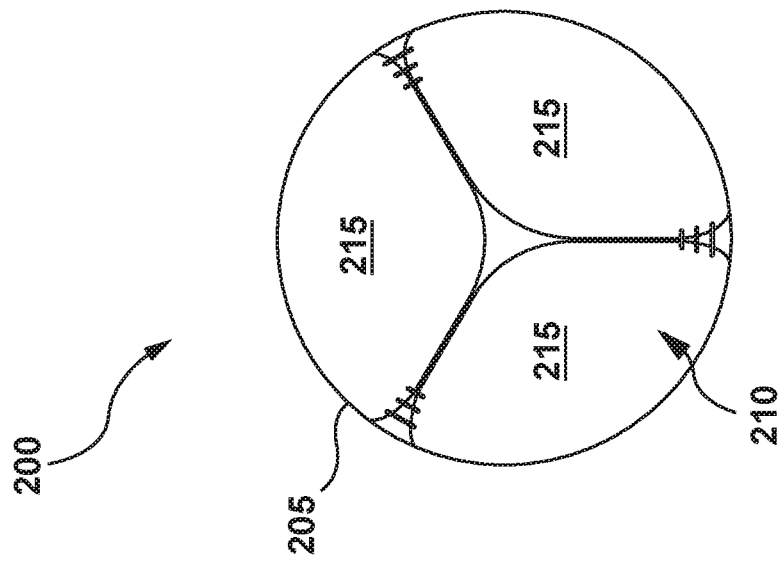
FIG. 1B shows a top view of the transcatheter heart valve prosthesis of FIG. 1A.

It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single device or component for purposes of clarity, it should be understood that the techniques of this disclosure may be performed by a combination of devices or components associated with, for example, a delivery device. The following detailed description is merely exemplary in nature and is not intended to limit the invention of the application and uses of the invention. Furthermore, there is no intention to be bound by any expressed or implied theory presented in the preceding field of the invention, background, summary or the following detailed description.

As used in this specification, the singular forms "a", "an" and "the" specifically also encompass the plural forms of the terms to which they refer, unless the content clearly dictates otherwise. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 20%. It should be understood that use of the term "about" also includes the specifically recited number of value.

The terms "proximal" and "distal" herein are used with reference to the clinician using the devices. Therefore, "proximal" and "proximally" mean in the direction toward the clinician, and "distal" and "distally" mean in the direction away from the clinician.

Further, numerical terms such as "first", "second", "third", etc. used herein are not meant to be limiting such that use of the term "second" when referring to a part in the specification does not mean that there necessarily is a "first" of part in order to fall within the scope of the invention. Instead, such numbers are merely describing that the particular embodiment being described has a "first" part and a "second" part. The invention is instead defined by the claims, in which one or more of the numbered parts may be claimed.

Embodiments hereof relate to a leaflet resection device or tool configured to resect one or more leaflets of a native heart valve and/or one or more leaflets of a previously implanted transcatheter or surgical heart valve prosthesis when implanting a transcatheter valve prosthesis. More particularly, in some embodiments, the leaflet resection device is configured to cut a portion of the leaflet in a curved path such that semicircular-shaped portion of the leaflet of a leaflet of a native heart valve or a previously implanted heart valve prosthesis is resected (removed) prior to implantation of the additional transcatheter valve prosthesis. In some embodiments, the leaflet resection device is configured to remove at least 50% of the leaflet, or at least 60% of the leaflet, or at least 70% of the leaflet, or at least 80% of the leaflet.

Figure 1A:
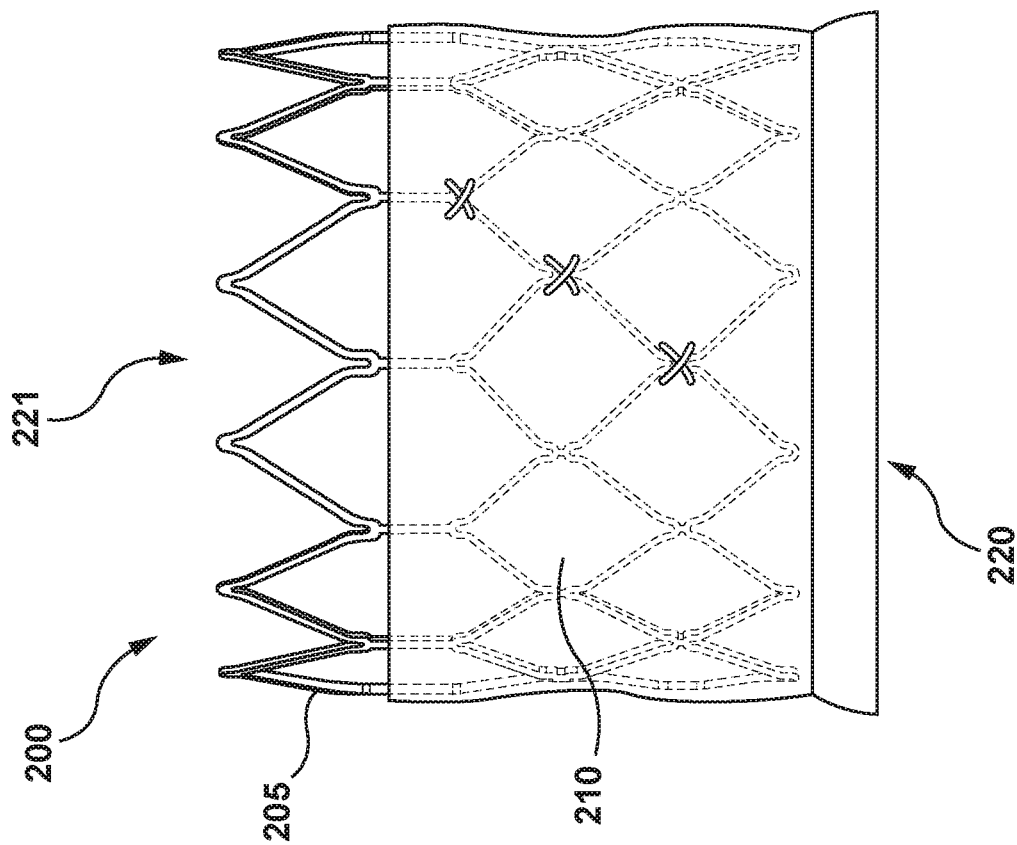
FIG. 1A shows a side view of a transcatheter heart valve prosthesis.

FIGS. 1A and 1B illustrate an example transcatheter heart valve prosthesis 200. The leaflet resection device or tool described herein may be used to resect a portion of one or more of the leaflets of the transcatheter heart valve prosthesis 200 after the transcatheter heart valve prosthesis 200 has been implanted into a native valve. As described below, the leaflet resection device described herein may be used to resect one or more leaflets of the transcatheter heart valve prosthesis 200. The transcatheter heart valve prosthesis 200 is illustrated herein in order to facilitate description of the present invention. The following description of the transcatheter heart valve prosthesis 200 is merely exemplary in nature and is not intended to limit the invention or the application and uses of the invention. Although the transcatheter heart valve prosthesis 200 is a balloon-expandable heart valve prosthesis configured for placement within an aortic heart valve, embodiments of the leaflet resection device described herein may be utilized to resect one or more leaflets of any transcatheter valve prosthesis that includes at least one leaflet. For example, embodiments of the leaflet resection device or tool described herein may be utilized to resect one or more leaflets of a heart valve prosthesis configured for placement within a pulmonary, aortic, mitral, or tricuspid valve, or may be utilized with a transcatheter valve prosthesis configured for placement within a venous valve or within other body passageways where it is deemed useful. There is no intention to be bound by any expressed or implied theory presented in the preceding technical field, background, brief summary or the following detailed description.

FIGS. 1A and 1B illustrate a side view and a top (outflow end) view, respectively, of the transcatheter heart valve prosthesis 200. The transcatheter heart valve prosthesis 200 includes a radially-expandable frame or stent 205 and a prosthetic valve 210. The frame 205 of the transcatheter heart valve prosthesis 200 supports the prosthetic valve 210 within the interior of the frame 205. In the example transcatheter heart valve prosthesis shown in FIGS. 1A-1C, the frame 205 is balloon-expandable. However, this is not meant to be limiting, and the frame 205 can be self-expanding or mechanically expandable.

The prosthetic valve 210 includes at least one leaflet 215 disposed within and secured to the frame 205. In the embodiment shown in FIGS. 1A-1C, the prosthetic valve 210 includes exactly three leaflets 215, as shown in FIG. 1B. However, this is not meant to be limiting, and the prosthetic valve 210 may include more or fewer leaflets 215. The valve leaflets 215 open and close to regulate flow through the transcatheter heart valve prosthesis 200.

As shown in FIG. 1A, the transcatheter heart valve prosthesis 200 includes an inflow end 220 and an outflow end 221. The prosthetic leaflets 215 are attached to the frame 205 such that when pressure at the inflow end 220 exceeds pressure at the outflow end 221, the prosthetic leaflets 215 open to allow blood flow through the heart valve prosthesis from the inflow end 220 to the outflow end 221. When the pressure at the outflow end 221 exceeds pressure at the inflow end 220, the prosthetic leaflets 215 closed to prevent blood flow from the outflow end 221 to the inflow end 220.

Figure 1C:
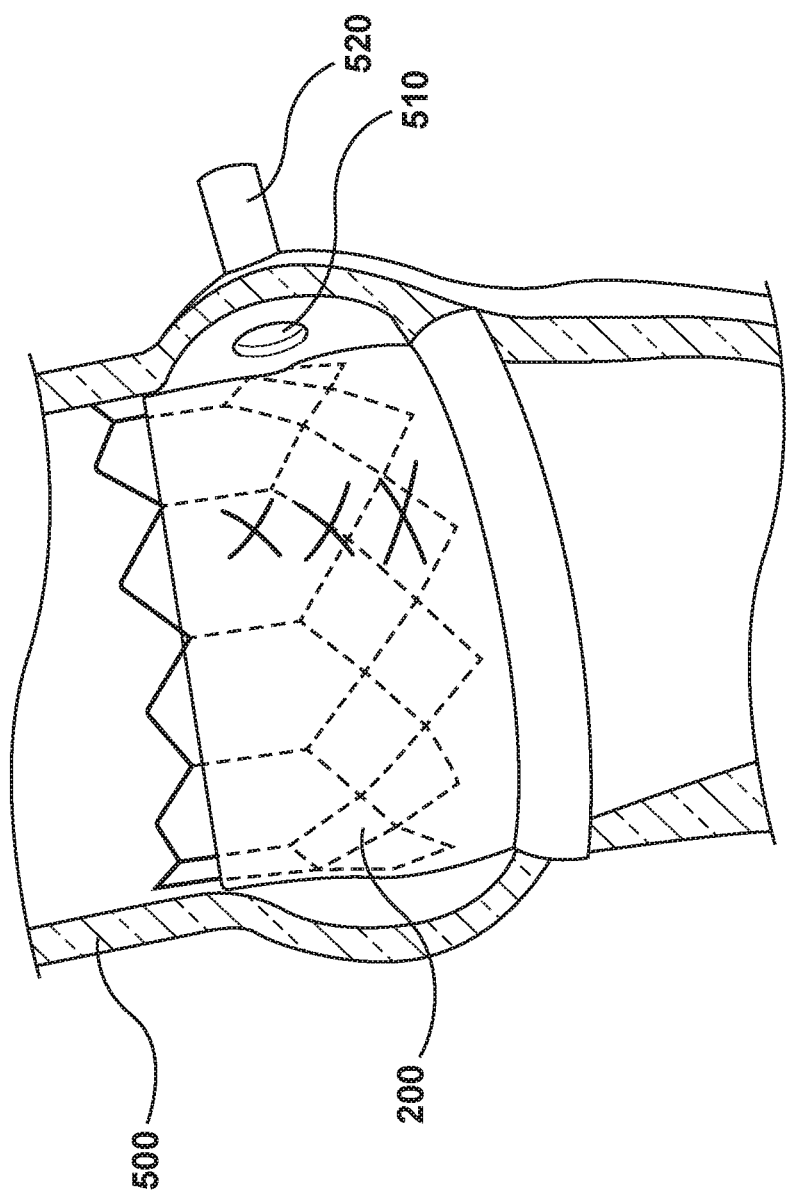
FIG. 1C shows the transcatheter heart valve prosthesis of FIG. 1A within a vasculature of a patient.

FIG. 1C shows the transcatheter heart valve prosthesis 200 within a vasculature of a patient. As can be seen, the transcatheter valve prosthesis 200 may be disposed adjacent to coronary ostia, one coronary ostium 510 being shown in FIG. 1C. The coronary ostium 510 is the opening of a coronary artery 520 disposed at a root of the vasculature 500, in this case the aorta, of the patient. In some cases, a second transcatheter heart valve prosthesis needs to be implanted within the transcatheter heart valve prosthesis 200 (i.e., a valve-in-valve procedure). In such a case, the second transcatheter heart valve prosthesis is inserted within the leaflets 215 of the transcatheter heart valve prosthesis 200 such that the leaflets 215 are opened and pressed against the frame 205. In such a case, the leaflets 215 of the transcatheter heart valve prosthesis 200 may block the coronary ostia. This blocking may also occur when implanting a transcatheter heart valve prosthesis in a previously installed surgical valve. Therefore, prior to installing the second transcatheter heart valve prosthesis in the transcatheter heart valve prosthesis 200 or in a surgically installed heart valve prosthesis, it is desirable to resect or remove at least a portion one or more of the leaflets of the previously implanted device. Further, in some instances, it may be desirable to resect or remove native valve leaflets prior to implantation of the first device. The present application is directed to a leaflet resection device to accomplish such resection.

Figure 2A:
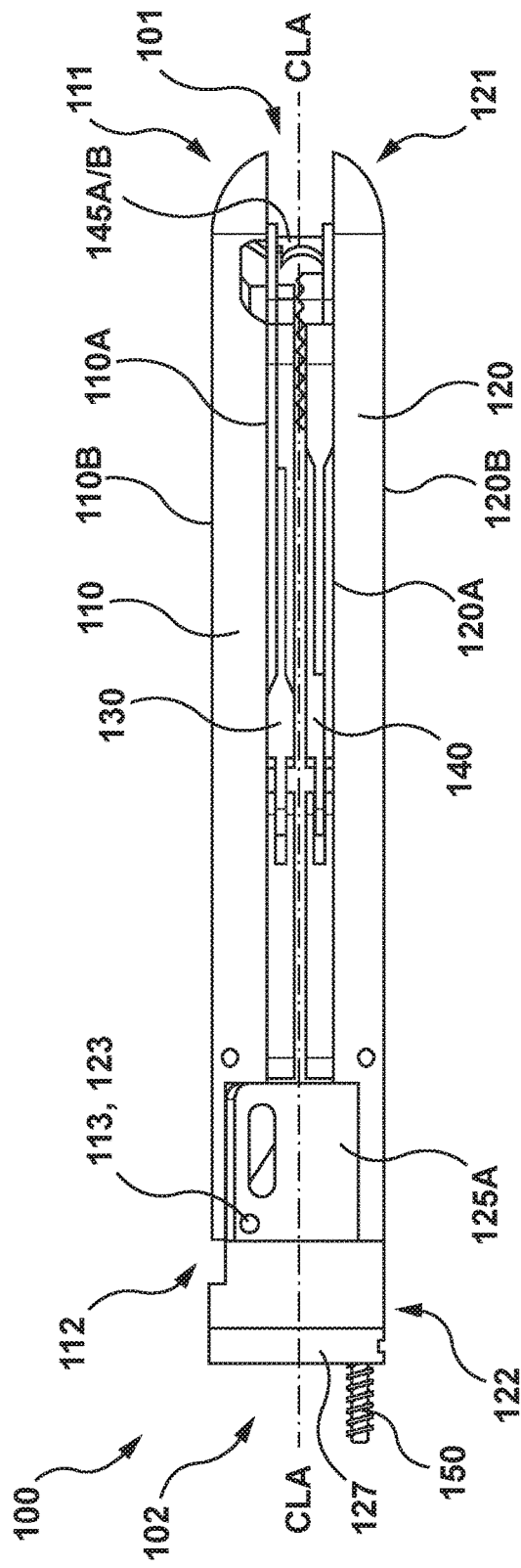
FIG. 2A shows a side view of a leaflet resection device according to an embodiment hereof.
Figure 2B:
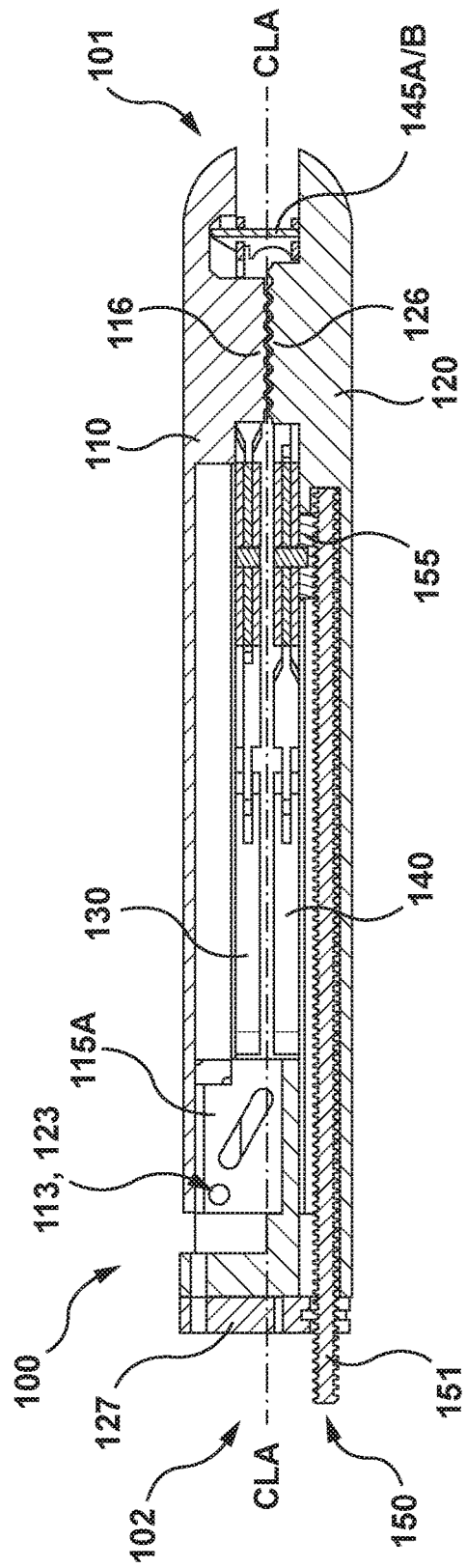
FIG. 2B shows a side cross-section of the leaflet resection device of FIG. 2A.

FIGS. 2A-2B show a leaflet resection device 100 according to embodiments herein. The leaflet resection device 100 includes a distal end 101 and a proximal end 102. The leaflet resection device 100 further includes a first jaw 110, a second jaw 120 pivotably connected to the first jaw 110, a first linkage assembly 130 coupled to the first jaw 110, a second linkage assembly 140 coupled to the second jaw 120, and an actuator 150 configured to actuate the first and second linkage assemblies 130, 140.

Figure 3:
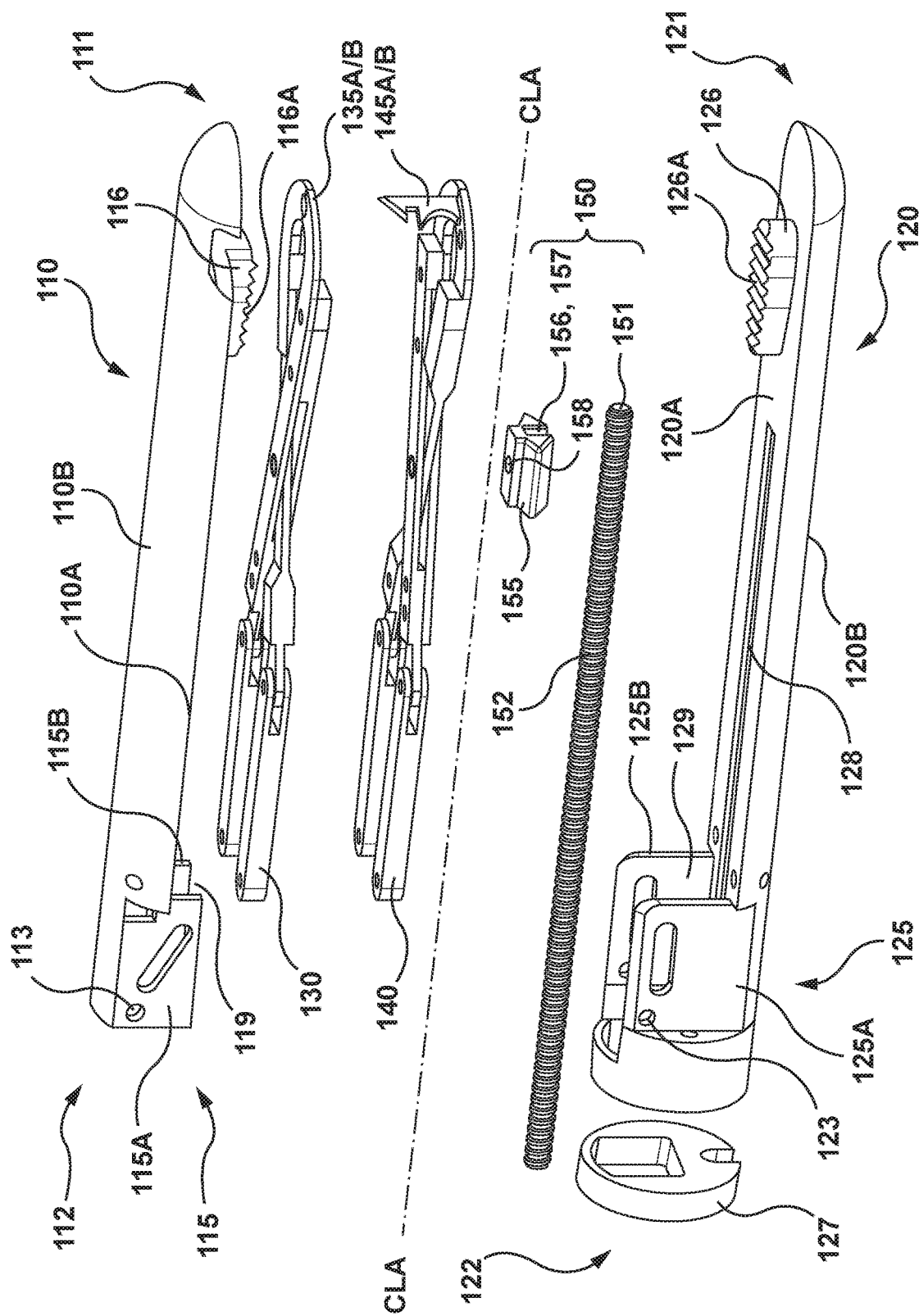
FIG. 3 shows an exploded view of the leaflet resection device of FIG. 2A.

The first jaw 110 includes a distal end 111 and a proximal end 112. The first jaw 110 further includes an inner surface 110A facing the second jaw 120 and an outer surface 110B facing away from the second jaw 120. The first jaw 110 further includes a first protruding grip 116 at the distal end 111 thereof protruding from the inner surface 110A towards the second jaw 120. As described in detail below, the first protruding grip 116, in combination with the second jaw 120, grasps tissue of a valve leaflet to be resected. The first protruding grip 116 may include features such as ridges 116A or other surface modifications to assist in achieving a secure grip on the tissue of the valve leaflet to be resected. The first jaw 110 further includes a first jaw hub 115 disposed at the proximal end 112. The first jaw hub 115 includes walls 115A, 115B extending towards the second jaw 120, and a cavity 119 between the walls 115A, 115B. First jaw alignment holes 113 are disposed through each of the walls 115A and 115B, respectively, transverse to a central longitudinal axis CLA of the leaflet resection device 100, as shown in FIGS. 2B and 3. The first jaw hub 115 is configured to couple the first jaw 110 to the second jaw 120, as explained below.

The second jaw 120 is pivotally connected to the first jaw 110. The second jaw 120 includes a distal end 121 and a proximal end 122. The second jaw 120 further includes an inner surface 120A facing the inner surface 110A of the first jaw 110 when the leaflet resection device 100 is assembled, and an outer surface 120B facing opposite the inner surface 120A. The second jaw 120 further includes a second protruding grip 126 at the distal end 121 thereof protruding from the inner surface 120A towards the inner surface 110A of the first jaw 110. As described in detail below, the second protruding grip 126, in combination with the first protruding grip 116, grasps tissue of a valve leaflet to be resected. The second protruding grip 126 may include features such as ridges 126A or other surface modifications to assist in achieving a secure grip on the tissue of the valve leaflet to be resected. The second jaw 120 further includes a second jaw hub 125 disposed at the proximal end 122. The second jaw hub 125 includes walls 125A, 125B extending towards the first jaw 110, and a cavity 129 between the walls 125A, 125B. Second jaw alignment holes 123 are disposed through each of the walls 125A and 125B, respectively, transverse to the central longitudinal axis CLA of the leaflet resection device 100, as shown in FIGS. 2A and 3. When assembled, the second jaw alignment holes 123 are aligned with the respective first jaw alignment holes 113 of the first jaw hub 115. A pin (not shown) or similar connector extends through the aligned first and second jaw alignment holes 113, 123 to connect the first jaw 110 to the second jaw 120 and enable pivoting of the first and second jaws 110, 120 relative to each other. In embodiments, the first jaw 110 may pivot towards and away from the second jaw 120.

The leaflet resection device 100 further includes a cap 127 coupled to the proximal end 122 of the second jaw 120. The cap 127 includes a recess adjacent the outer surface 120B of the second jaw 120 when the cap 127 is coupled to the second jaw 120, as best seen in FIG. 2B. The recess houses a washer-like component that is attached to a lead screw 151 of the actuator 150, which is described in more detail below. This attachment prevent longitudinal (proximal/distal) translation of the lead screw 151 when it is rotated, thereby enabling longitudinal translation of the lead nut 155 to actuate the second linkage assembly 140, as explained in more detail below.

As described above, the first and second jaws 110, 120 are pivotably connected such that the leaflet resection device 100 includes an open configuration and a closed configuration, as shown in FIG. 4A and FIG. 4B, respectively. In the open configuration, the first jaw 110 pivots away from the second jaw 120 at the alignment holes 113, 123 such that the first jaw 110 and the second jaw 120 are spaced apart from one another. FIG. 4A shows the leaflet resection device 100 in the open configuration. In the closed configuration, the first jaw 110 pivots towards the second jaw 120 at the alignment holes 113, 123 such that the first jaw 110 and the second jaw 120 contact one another at the first protruding grip 116 of the first jaw 110 and the second protruding grip 126 of the second jaw 120 at the distal end 101 of the leaflet resection device 100. FIG. 4B shows the leaflet resection device 100 in the closed configuration. The embodiments of the leaflet resection device 100 described herein relate to the first jaw 110 being pivotally moveable in relation to the second jaw 120, with the second jaw 120 not being pivotable. However, in some embodiments, the second jaw 120 may be able to pivot towards and away from the first jaw 110.

As noted above, the leaflet resection device further includes the first linkage assembly 130. FIG. 3 shows an exploded view of the leaflet resection device 100 showing the first linkage assembly 130. The first linkage assembly 130 is coupled to the inner surface 110A of the first jaw 110, such as by pins (not shown) extending through openings through the first linkage assembly 130 at proximal pivot points 169A and 169B (described with respect to FIGS. 5A-5D) and corresponding openings or cavities (not shown) in the inner surface 110A of the first jaw 110.

Figures 5A, 5B:
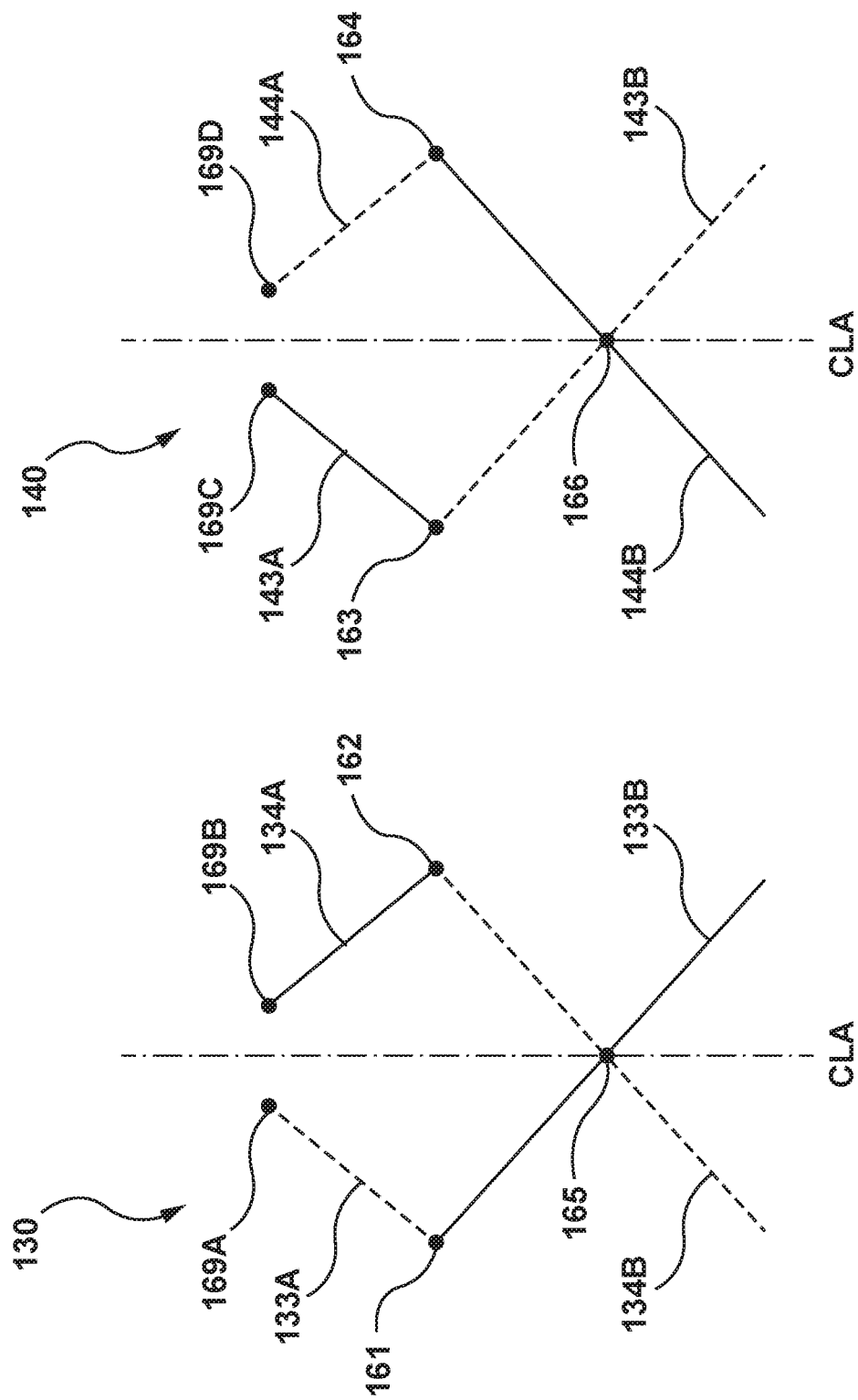
FIG. 5A shows a schematic illustration of a first linkage assembly according to an embodiment hereof.
FIG. 5B shows a schematic illustration of a second linkage assembly corresponding to the first linkage assembly embodiment in FIG. 5A.

As shown in FIGS. 3, 5A, and 8A-8C, the first linkage assembly 130 of the leaflet resection device 100 includes a first arm 133 and a second arm 134. The first arm 133 includes a first proximal arm 133A, a first distal arm 133B, and a first pivot point 161 disposed between the first proximal arm 133A and the first distal arm 133B. The first pivot point 161 pivotably couples the distal end of the first proximal arm 133A to a proximal end of the first distal arm 133B. A proximal pivot point 169A at a proximal end of the first proximal arm 133A pivotably couples the first proximal arm 133A to the first jaw 110. The second arm 134 includes a second proximal arm 134A, a second distal arm 134B, and a second pivot point 162 disposed between the second proximal arm 134A and the second distal arm 134B. The second pivot point 162 pivotably couples the distal end of the second proximal arm 134A to the proximal end of the second distal arm 134B. A proximal pivot point 169B at a proximal end of the second proximal arm 134A pivotably couples the second proximal arm 134A to the first jaw 110. As seen in FIG. 5A, a center portion of the first distal arm 133B and a center portion of the second distal arm 134B cross, and are coupled to one another, at a first distal pivot point 165. As such, the first distal arm 133B and the second distal arm 134B create a "X" shape, with the first distal pivot point 165 being the crossing location the "X" shape.

As also noted above, the leaflet resection device 100 also includes the second linkage assembly 140. FIG. 3 shows an exploded view of the leaflet resection device 100 showing the second linkage assembly 140. The second linkage assembly 130 is coupled the inner surface 120A of the second jaw 120, such as by pins (not shown) extending through openings through the second linkage assembly 140 at proximal pivot points 169C and 169D (described with respect to FIGS. 5A-5D) and corresponding openings or cavities (see FIG. 3) in the inner surface 120A of the second jaw 120. The second linkage assembly 140 is disposed opposite the first linkage assembly 130 and aligned therewith such that the first and second linkage assemblies 130, 140 could be described as one on top of the other, although direction is not implied with such a description.

As shown in FIGS. 3, 5B, 7A, and 8A-8C, the second linkage assembly 140 includes a third arm 143 and a fourth arm 144. The third arm 143 includes a third proximal arm 143A, a third distal arm 143B, and a third pivot point 163 disposed between the third proximal arm 143A and the third distal arm 143B. The third pivot point 163 pivotably couples the distal end of the third proximal arm 143A to the proximal end of the third distal arm 143B. A proximal pivot point 169C at a proximal end of the third proximal arm 143A pivotably couples the third proximal arm 143A to the second jaw 120. The fourth arm 144 includes a fourth proximal arm 144A, a fourth distal arm 144B, and a fourth pivot point 164 disposed between the fourth proximal arm 144A and the fourth distal arm 144B. The fourth pivot point 164 pivotably couples the distal end of the fourth proximal arm 144A to the proximal end of the fourth distal arm 144B. A proximal pivot point 169D at a proximal end of the fourth proximal arm 144A pivotably couples the fourth proximal arm 144A to the second jaw 120. As shown in FIG. 5B, a center portion of the third distal arm 143B and a center portion of the fourth distal arm 144B cross, and are coupled to one another, at a second distal pivot point 166. As such, the third distal arm 143B and the fourth distal arm 144B create an "X" shape, with the second distal pivot point 166 being the crossing location of the "X" shape.

Figure 6D:
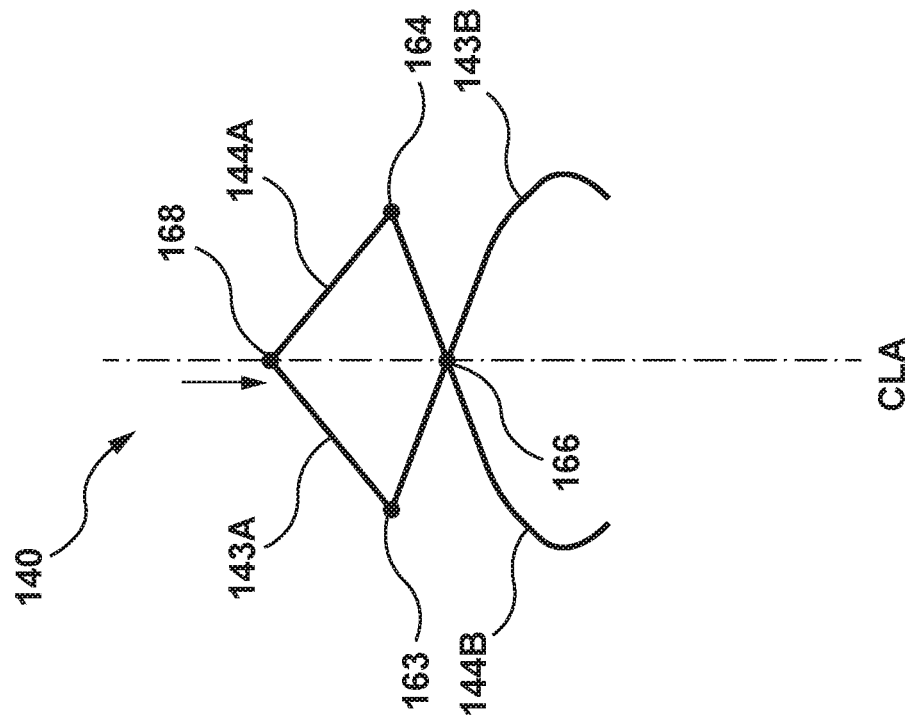
FIGS. 6C-6D show schematic illustrations of actuation of the second linkage assembly of FIG. 6B.
Figure 6C:
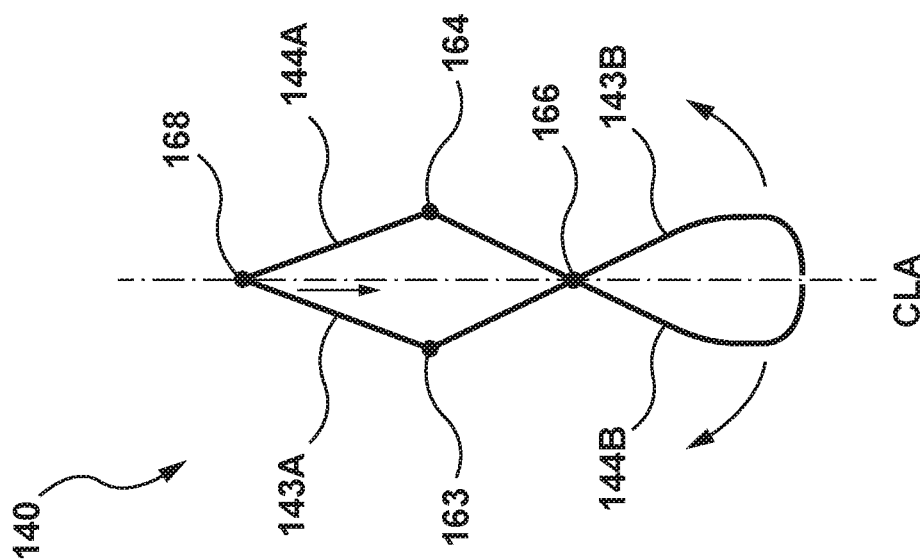
Figures 7A, 7B:
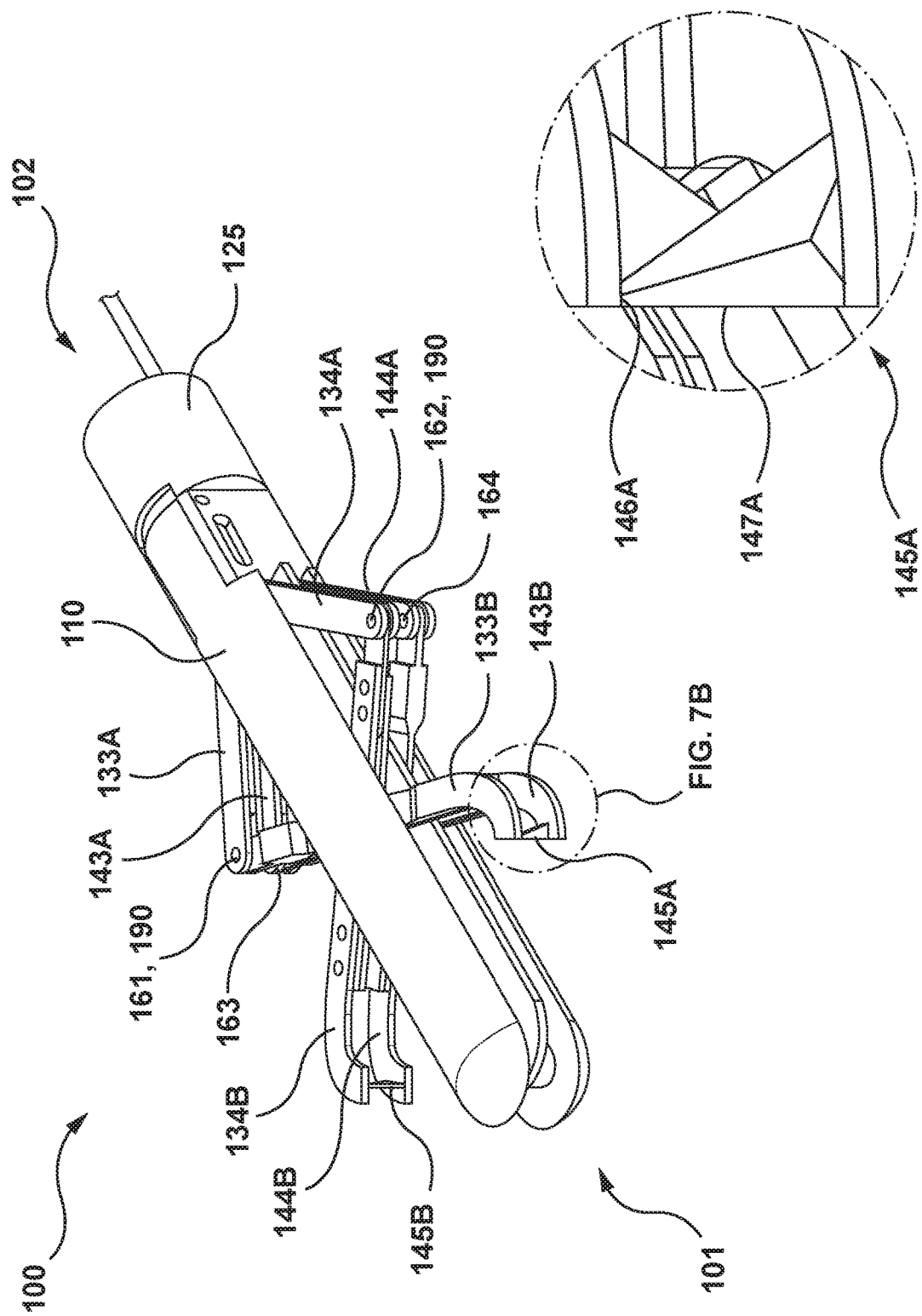
FIG. 7A shows a perspective top view of a leaflet resection device according to an embodiment hereof.
FIG. 7B shows a close-up view of a resection blade of the leaflet resection device of FIG. 7A.

In the embodiment of FIGS. 2-8C, the second linkage assembly 140 includes a first resection blade 145A disposed on a distal end of the third distal arm 143B and a second resection blade 145B disposed on a distal end of the fourth distal arm 144B, as best seen in FIGS. 3 and 7A-7B. The first resection blade 145A includes a first tip 146A and a first edge 147A, as shown in FIG. 7B. The first resection blade 145A is coupled to the distal end of the third distal arm 143B and extends therefrom transverse to the central longitudinal axis CLA and towards the inner surface 110A of the first jaw 110 (vertically upward if the first jaw 110 is viewed as the top) such that the first tip 146A contacts a distal end of the first distal arm 133B of the first linkage assembly 130. In the embodiment shown, the distal end of the first distal arm 133B includes a slot 135A configured to house the first tip 146A of the first resection blade 145A when the first and second jaws 110, 120 are in the closed configuration, as described in more detail below. The first edge 147A of the first resection blade 145A extends towards the first jaw 110 (vertically upward) and faces outwards relative to the central longitudinal axis CLA of the leaflet resection device 100 such that the first edge 147A may cut, or resect, a leaflet when the third distal arm 143B travels a curved path when actuated, as described in more detail below. Similarly, the second resection blade 145B includes a second tip 146B and a second edge 147B. The second resection blade 145B is extends therefrom transverse to the central longitudinal axis CLA and towards the inner surface 110A of the first jaw 110 (vertically upward if the first jaw 110 is viewed as the top) such that the second tip 146B contacts a distal end of the second distal arm 134B on the first linkage assembly 130. In the embodiment shown, the distal end of the second distal arm 134B includes a slot 135B configured to house the second tip 146B of the second resection blade 145B when the first and second jaws 110, 120 are closed. The second edge 147B of the second resection blade 145B extends towards the first jaw 110 (vertically upward) and faces outwards relative to the central longitudinal axis CLA of the leaflet resection device 100 such that the second edge 147B may cut, or resect, a leaflet when the fourth distal arm 144B travels a curved path when actuated, as described in more detail below. The first and second tips 146A, 146B are utilized to puncture a leaflet of a valve when the leaflet resection device 100 is closed with the leaflet disposed between first and second jaws 110, 120. Although the first and second resection blades 145A, 145B are described above a extending from the second linkage assembly 140 to the first linkage assembly 130, this is not meant to be limiting. In other embodiments (not shown), resection blades may instead extend from the first linkage assembly to the second linkage assembly, or resection blades may extend from both the first and second linkage assemblies to the second and first linkage assemblies, or one resection blade may extend from the first linkage assembly to the second linkage assembly and a second blade may extend from the second linkage assembly to the first linkage assembly, or any combination thereof.

In the embodiment shown, the first linkage assembly 130 is removably coupled to the second linkage assembly 140 when the leaflet resection device 100 is in the closed configuration. As best shown in FIG. 7A, pins 190 or other coupling mechanisms couple the first and second linkage assemblies at corresponding first and third pivot points 161, 163, corresponding second and fourth pivot points 162, 164, and corresponding first and second distal pivot points 165, 166. Further, as described above, the first and second linkage assemblies 130, 140 may be coupled together at first and second resection blades 145A, 145B. These coupling locations are not coupled when the leaflet resection device 100 is in the open configuration such that the first and second linkage assemblies 130, 140 may be separated such the leaflet to be resected may be disposed therebetween.

As noted above, the leaflet resection device 100 further includes the actuator 150. In the embodiment shown, the actuator 150 includes a lead screw 151 and a lead nut 155. The lead screw 151 includes external threads 152. The lead nut 155 includes internal threads 156 in a longitudinal channel 157. The channel 157 is sized and shaped to receive the lead screw 151 therein such that the internal threads 156 of the lead nut 155 mate with the external threads 152 of the lead screw 151. In the embodiment shown, the lead screw 151 is disposed within a longitudinal cavity 128 in the inner surface 120A of the second jaw 120. The lead nut 155 also includes an opening 158 such that the lead nut 155 may be coupled to the pivot point 166 in the second linkage assembly 140. The lead screw 151 extends to a proximal end of the device (not shown). To actuate the first and second linkage assemblies 130, 140, as described in more detail below; the lead screw 151 is rotated. Rotating the lead screw 151 causes the rotation of the external threads 152. Because the lead nut 155 cannot rotate and is coupled to the external threads of the lead screw 151 via the internal threads 156, rotation of the lead screw 151 causes longitudinal translation of the lead nut 155. Rotation of the lead screw 151 in a first direction causes the lead nut 155 to longitudinally translate proximally, whereas rotation of the lead screw 151 in a second direction causes the lead nut 155 to longitudinally translate distally. Translation of the lead nut 155 proximally causes the pivot point 166 to translate proximally, as shown by the arrows in FIG. 8B, thereby causing the second linkage assembly 140 to actuate from the delivery configuration, as shown in FIG. 8A, to the completed resection position shown in FIG. 8C. In the embodiment shown, the actuator 150 moves the second linkage assembly 140. In turn, as described above, the second linkage assembly 140 is coupled to the first linkage assembly 130 when the leaflet resection device 100 is in the closed configuration such that the movement of the second linkage assembly 140 is transferred to the first linkage assembly 130. Thus the first linkage assembly 130 in the embodiment shown is a "follower" or is "passively" actuated. However, this is not meant to be limiting, and the first linkage assembly 130 may have its own actuator. Further, in such an embodiment, the actuators of the first and second linkage assemblies may be coupled and/or synchronized such that the first and second linkage assemblies are actuated together. Further, although the actuator is described having the lead screw and lead nut actuator, this is not mean to be limiting, and other actuators may be used. For example, and not by way of limitation, the actuator may be a slidable rod coupled to the second linkage assembly, such as at the second distal pivot point. The slidable rod may be pulled and pushed from a proximal end thereof to proximally retract and distally advance the second distal pivot point, respectively. As would be apparent to those skilled in the art, other actuation mechanisms may also be used in keeping with the principles of operation of the leaflet resection device described herein.

With the structure of the leaflet resection device 100 described above, operation of the leaflet resection device will be described with respect to the FIGS. 5A-5D, 6A-6D, and 8A-8C. As shown in FIG. 8A, the leaflet resection device includes a delivery or tracking configuration. In the delivery configuration, the first and second linkage assemblies 130, 140 are in an elongated configuration such that the arms of the first and second linkage assemblies are disposed adjacent the central longitudinal axis CLA of the leaflet resection device 100. Further, the first and second linkage assemblies 130, 140 are disposed laterally within the lateral boundaries of the first and second jaws 110, 120. In other words, the first and second linkage assemblies 130, 140 in the delivery configuration do not extend laterally outside of the first and second jaws 110, 120 such that the first and second linkage assemblies 130, 140 will not damage tissue during delivery to the treatment site. As the first and second linkage assemblies 130, 140 are actuated, as described in more detail below; the distal ends of the first, second, third, and fourth distal arm portions 134B, 134B, 143B, 144B move along a curved path proximally and radially outward relative to the central longitudinal axis CLA, as shown in FIGS. 8B-8C. Such movement thereby also moves the first and second resection blades 145A, 145B along a curved path proximally and radially outward relative to the central longitudinal axis CLA of the leaflet resection device 100, as shown in FIGS. 8B-8C. Details of this movement are provided below.

In the embodiment of FIGS. 5A-5D and 8A-8C, the first and second linkage assemblies 130, 140 are as described above. In this embodiment, the proximal pivot points 169A-169D are fixed in that they do not translate longitudinally. In other words, the proximal pivot points 169A-169D enable rotation, but not translation. The first and second distal pivot points 165, 166, on the other hand, are translatable and rotatable. Thus, as shown in FIGS. 5C-5D and 8A-8C, with the leaflet resection device in the closed configuration, the actuator 150 is actuated such that the second distal pivot point 166 of second linkage assembly 140 is translated proximally. With the proximal pivot points 169C, 169D of the second linkage assembly 140 fixed, the third and fourth pivot points 163, 164 move outward with respect to the central longitudinal axis CLA and also move proximally, as shown in FIGS. 6C-6D and 8B-8C. This movement causes the distal ends of the third and fourth proximal arms 143A, 144A and the proximal ends of the third and fourth distal arms 143B, 144B to also move outward and proximally. With this movement and the connection between the third and fourth distal arms 143B, 144B at the distal pivot point 166, the distal ends of the ends of the third and fourth distal arms 143B, 144B also move outward relative to the central longitudinal axis CLA (on the opposite side of the central longitudinal axis CLA as the proximal ends thereof) and proximally in a curved path 170 as shown in FIGS. 5C-5D and 8B-8C. It is noted that the above description is with respect to the second linkage assembly 140, but it applies equally to the first linkage assembly 130 as shown in FIGS. 8A-8C as the two linkage assemblies are linked together, as described above, or actuated together.

In another embodiment, as shown in FIGS. 6A-6D, a proximal end of the first proximal arm 133A and the proximal end of the second proximal arm 134A of the first linkage assembly 130 are aligned and coupled to one another at a first proximal pivot point 167. Similarly, as shown in FIG. 6B, a proximal end of the third proximal arm 143A and a proximal end of the fourth proximal arm 144A of the second linkage assembly 140 are aligned and coupled to one another at a second proximal pivot point 168. In the embodiment shown in FIGS. 6A-6B, the proximal pivot points 167, 168 translate longitudinally relative to the first and second jaws 110, 120 when the actuator is actuated. Thus, instead of the actuator translating the distal pivot point 166 of the second linkage assembly 140, as described in the embodiment of FIGS. 5A-5D described above, the actuator translates the second proximal pivot point 168 of the second linkage assembly 140. Further, in this embodiment, the distal pivot point 166 of the second linkage assembly 140 is fixed to the second jaw 120 such that that distal pivot point 166 does not translate. As shown in FIGS. 6C-6D, translating the proximal pivot point 168 distally while the distal pivot point 166 does not translate causes the pivot points 163, 164 to each move outward relative to the central longitudinal axis CLA and to move distally. This movement also causes the third and fourth proximal arms 143A, 144A to rotate about the pivot points such that the distal ends of the third and fourth proximal arms 143 move outward relative to the central longitudinal axis CLA. The movement also causes the proximal ends of the third and fourth distal arms 143B, 144B to move radially outward relative to the central longitudinal axis CLA. With this movement and the connection between the third and fourth distal arms 143B, 144B at the distal pivot point 166, the distal ends of the third and fourth distal arms 143A, 144B also move outward relative to the central longitudinal axis CLA (on the opposite side of the central longitudinal axis CLA as the proximal ends thereof) and proximally in a curved path as shown in FIGS. 6C-6D. It is noted that the above description of FIGS. 6C-6D is with respect to the second linkage assembly 140, but it applies equally to the first linkage assembly 130 the two linkage assemblies are linked together, as described above, or actuated together.

While FIGS. 6A-6D have been described with the distal pivot points 165, 166 longitudinally fixed and the proximal pivot points 167, 168 longitudinally translatable, this is not mean to be limiting. In other embodiments, the proximal pivot points 167, 168 may be longitudinally fixed and the distal pivot points 165, 166 may be longitudinally translatable, similar to the embodiment described with respect to FIGS. 5A-5D.

Figure 9:
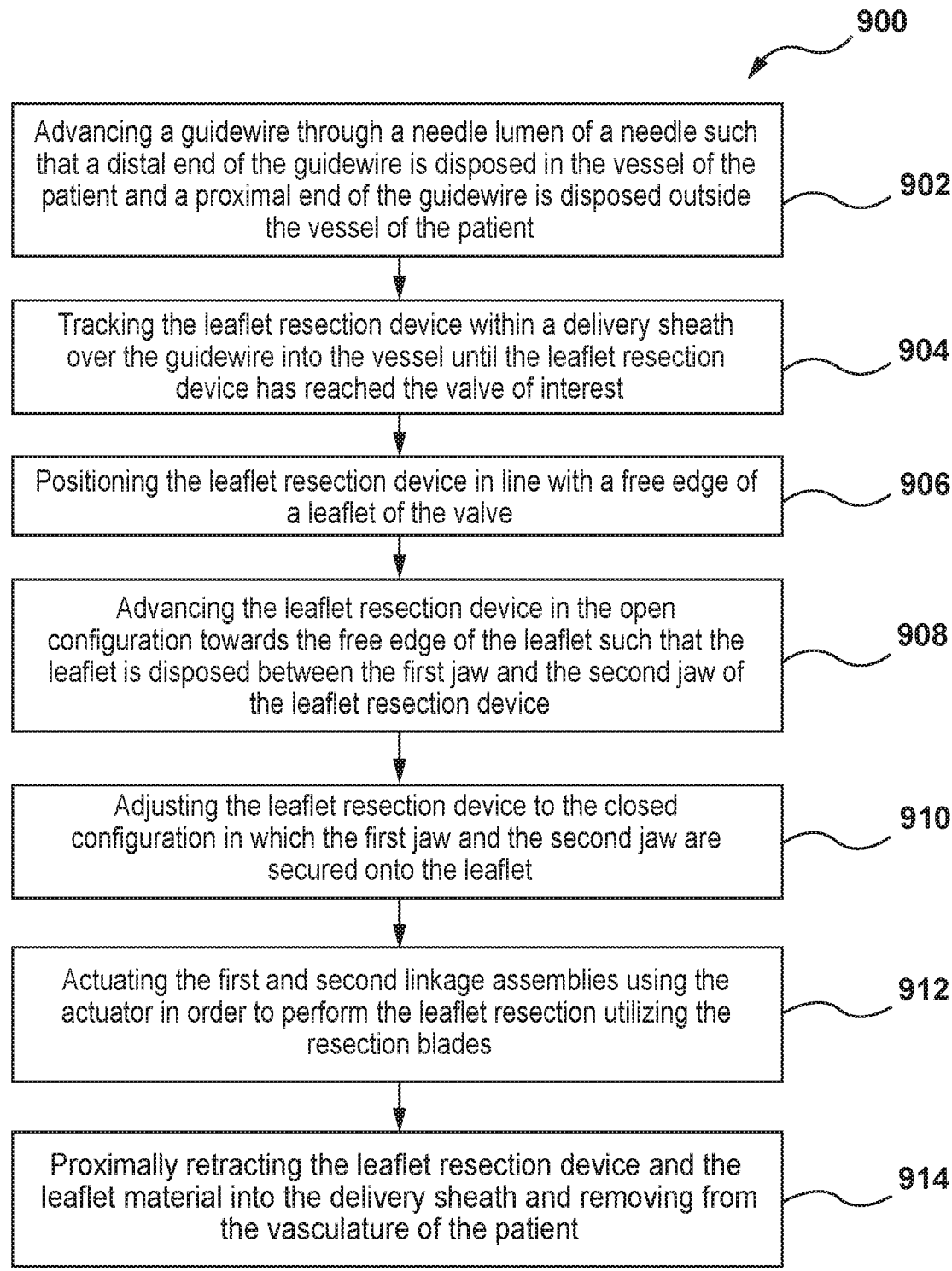
FIG. 9 is a block diagram that shows a method of using the leaflet resection device according to an embodiment hereof.

FIGS. 9-10E illustrate a method for resecting a leaflet of a valve of interest within a patient using the leaflet resection device 100 according to embodiments herein. As previously discussed above, the valve of interest can be, for example, a native heart valve or a previously-implanted heart valve prosthesis. Accordingly, the leaflet to be resected can be, for example, a native heart valve leaflet or a prosthetic leaflet from the previously-implanted heart valve prosthesis. In the embodiments described herein, the leaflet to be resected is a leaflet 215 of a transcatheter valve prosthesis 200. In a step 902 of the method 900 (not shown), a needle may be inserted through a wall of a vessel, wherein the needle includes a needle lumen. With the needle having gained access to the vessel, a guidewire 400 is inserted through an opening in a proximal end of the needle lumen. A distal end of the guidewire 400 is advanced through the needle lumen and extends through a distal end of the needle lumen. Thus, a distal end of the guidewire 400 is disposed in the vessel, or vasculature 500, of the patient.

Figures 10A, 10B:
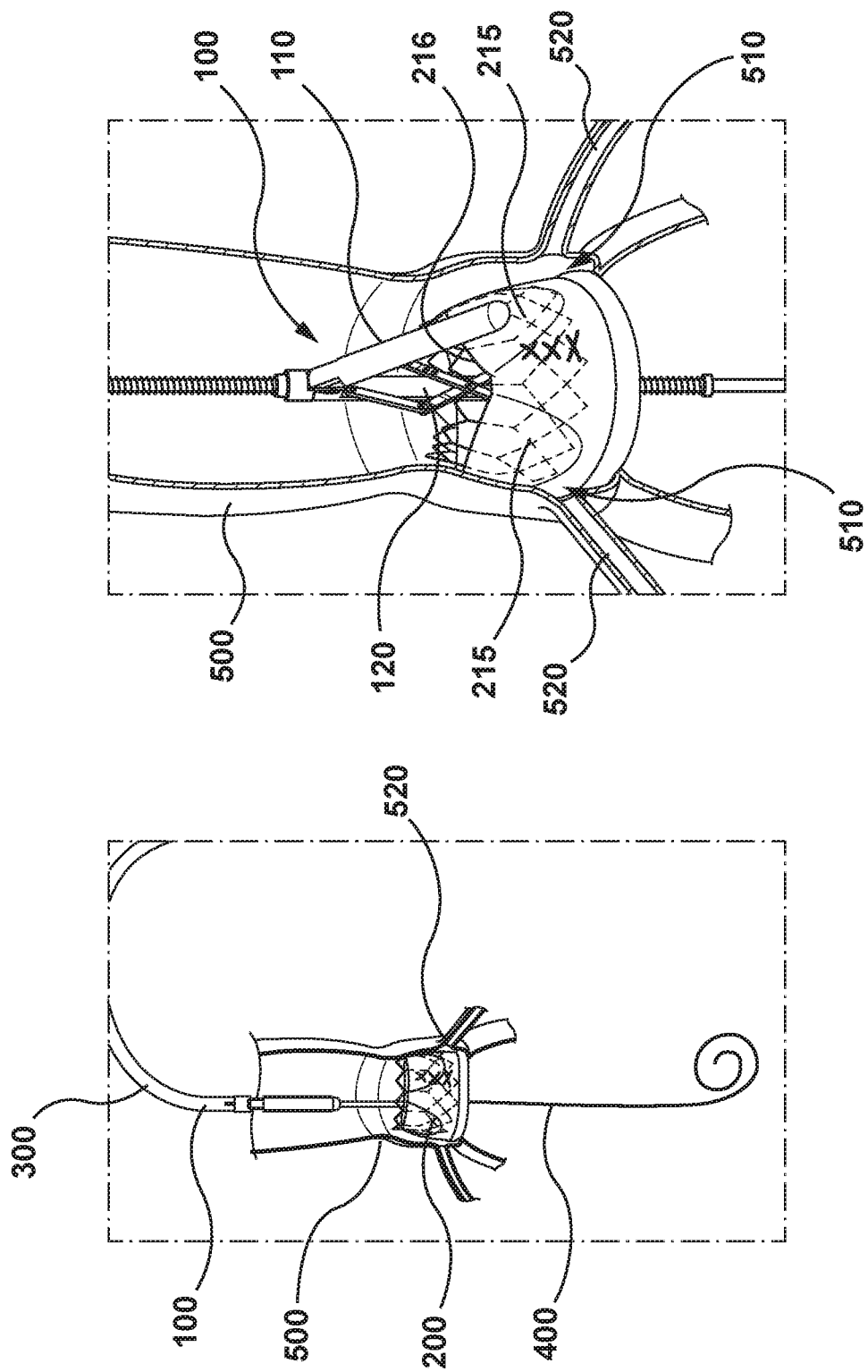
FIG. 10A shows a step in the method of FIG. 9, showing the leaflet resection device advancing over the guidewire to the valve of interest.
FIG. 10B shows a step in the method of FIG. 9, showing the leaflet resection device in an open configuration.

In a step 904 of the method 900, the leaflet resection device 100 is enclosed within a delivery sheath 300 and tracked over the guidewire 400 into the vessel 500 of the patient until the leaflet resection device 100 reaches the transcatheter heart valve prosthesis 200, as shown in FIG. 10A. In this step, the leaflet resection device 100 is in the closed configuration and the first and second linkage assemblies 130, 140 are in the delivery configuration. The delivery sheath 300 may be retracted proximally or the leaflet resection device 100 may be advanced distally to expose the leaflet resection device 100.

In a step 906 of the method 900, the leaflet resection device 100 is positioned in line with a free edge 216 of a leaflet 215 of the transcatheter heart valve prosthesis 200 and the first jaw 110 is pivoted away from the second jaw 120 such that the leaflet resection device 100 is in the open configuration, as shown in FIG. 10B.

Figures 10C, 10D:
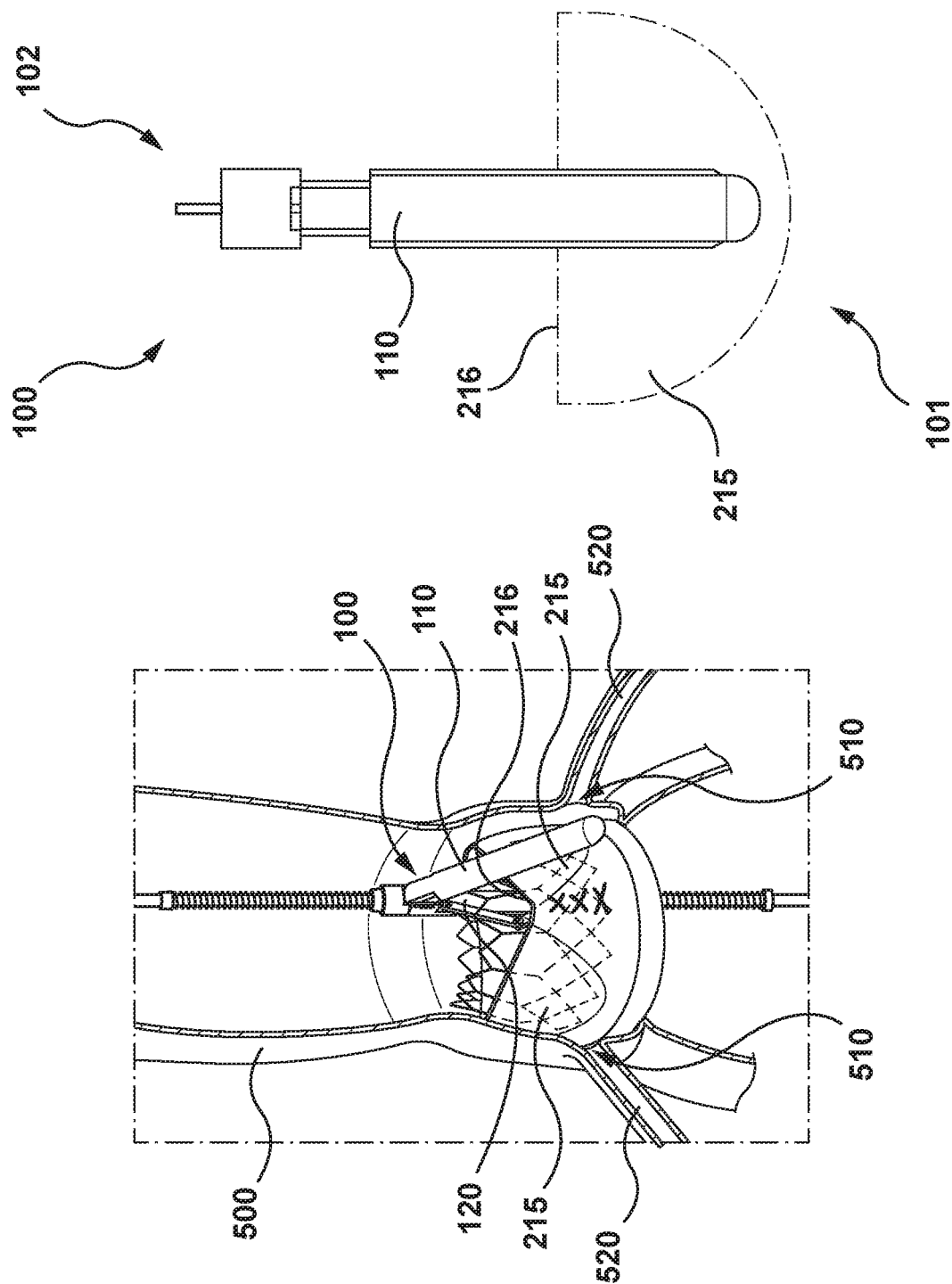
FIG. 10C shows a step in the method of FIG. 9, showing the leaflet resection device around a leaflet.
FIG. 10D shows a step in the method of FIG. 9, showing a top view of the leaflet resection device in a closed configuration on the leaflet.

In a step 908 of the method 900, the leaflet resection device 100 is advanced in the open configuration towards the free edge 216 of the leaflet 215 such that a center portion of the leaflet 215 is disposed between the first jaw 110 and the second jaw 120 of leaflet resection device 100, as shown in FIG. 10C. In FIG. 10C, the second jaw 120 and the second linkage assembly 140 that includes the resection blades 145A, 145B are shown on an interior side of the leaflet 215 and the first jaw 110 and the first linkage assembly 130 are shown on an exterior side of the leaflet 215. However, this is not meant to be limiting, and in other embodiments the second jaw 120 and the second linkage assembly 140 may be disposed on the exterior side of the leaflet 215 and the first jaw 110 and the first linkage assembly 130 may be disposed on the interior side of the leaflet 215 in this step.

In a step 910 of the method 900, the first jaw 110 of the leaflet resection device 100 pivots towards the second jaw 120 such that the leaflet resection device 100 is in the closed configuration. During this step, the first and second tips 146A, 146B of the first and second resection blades 145A, 145B puncture through the leaflet 215. Further, the first protruding grip 116 of the first jaw 110 and the second protruding grip 126 of the second jaw 120 are closed and grasp the leaflet 215 therebetween, as shown in FIG. 10D.

In a step 912 of the method 900, the actuator 150 is activated to actuate the first and second linkage assemblies 130, 140, as previously described in detail above. In this step, the first and second linkage assemblies 130, 140 are actuated such that the resection blades 145A and 145B disposed at the distal ends of the distal arms 143B, 144B are pulled outwards relative to the central longitudinal axis CLA and proximally away from the distal end 101 of the leaflet resection device 100 along a curved or arched resection path 170 as shown by the dotted line in FIG. 10E. As the first and second resection blades 145A, 145B move along the curved path 170, the first and second edges 147A, 148A cut the leaflet 215 along the curved path 170. The first and second linkage assemblies 130, 140 of the leaflet resection device 100 continue to be retracted proximally by the actuator 150 until the first and resection blades 145A, 145B disposed at the distal end of the distal arms 143B, 144B reach the free edge 216 of the leaflet 215 and cut through the free edge 216 of the leaflet 215. This results in the first and second linkage assemblies 130, 140 reaching the complete resection position as shown in FIG. 10F. At this step, the resected portion of the leaflet 215 disposed within the first and second jaws 110, 120 of the leaflet resection device 100 is at least 50%, or at least 60%, or at least 70%, or at least 80% of the leaflet 215 and is completely separated from the rest of the leaflet 215. Further, the resected portion of the leaflet 215 is generally semicircular in shape. As used herein, the term "generally semicircular" is not limited to a geometric circle. In particular, in the embodiment shown, path 170 of the resection blades is not circular. Thus, "generally semicircular" as used herein encompasses elliptical, oval, and/or other curved shapes. Further, the term "generally semicircular" is not limited to exactly 50% of a circle or other curved shape. Instead, it is mean to convey that a chunk of the leaflet is removed that includes a portion of the generally straight free edge of the valve and a curved path extending from the free edge towards the nadir of the leaflet and back to the free edge of the leaflet.

In a step 914 of the method 900 (not shown), while the resected portion of the leaflet 215 to be removed is still secured within the jaws 110, 120 of the leaflet resection device 100, the first and second linkage assemblies 130, 140 are actuated such that the first and second linkage assemblies 130, 140 return to the delivery configuration. Once this is done, the leaflet resection device 100, in the closed configuration with the resected leaflet portion disposed between the jaws 110, 120, may be retracted proximally back into the delivery sheath 300. The leaflet resection device and the delivery sheath 300 may then be removed altogether from the vasculature 500 of the patient.

It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single device or component for purposes of clarity, it should be understood that the techniques of this disclosure may be performed by a combination of devices or components.

What is claimed is:

1. A leaflet resection device having a central longitudinal axis, the leaflet resection device comprising:
    a first jaw, the first jaw including a distal end and a proximal end;
    a second jaw pivotably coupled to and opposing the first jaw, the second jaw including a distal end and a proximal end;
    a first linkage assembly coupled to the first jaw, the first linkage assembly including:
        a first arm having a first proximal arm, a first distal arm, and a first pivot point pivotably coupling the first proximal arm and the first distal arm;
        a second arm having a second proximal arm, a second distal arm, and a second pivot point pivotably coupling the second proximal arm and the second distal arm, wherein the first and second distal arms cross and are pivotably connected at a first distal pivot point distal of the first and second pivot points;
        a first resection blade coupled to a distal end of the first distal arm and extending towards the second jaw; and
        a second resection blade coupled to a distal end of the second distal arm and extending towards the second jaw; and
    an actuator coupled to the first linkage assembly;
    wherein in a delivery configuration, the first linkage assembly is elongated such that the first and second arms are disposed laterally within the first jaw, and when actuated by the actuator, the first arm pivots about the first pivot point and the first distal pivot point, and the second arm pivots about the second pivot point and the first distal pivot point such that the distal ends of the first and second distal arms move along a curved path proximally and outwardly relative to the central longitudinal axis of the leaflet resection device.

2. The leaflet resection device of claim 1, further comprising:
    a second linkage assembly coupled to the second jaw, the second linkage assembly including:
        a third arm having a third proximal arm, a third distal arm, and a third pivot point pivotably coupling the third proximal arm and the third distal arm; and
        a fourth arm having a fourth proximal arm, a fourth distal arm, and a fourth pivot point pivotably coupling the fourth proximal arm and the fourth distal arm,
        wherein the third and fourth distal arms cross and are pivotably connected at a second distal pivot point distal of the third and fourth pivot points;
    wherein in the delivery configuration, the second linkage assembly is elongated such that the third and fourth arms are disposed laterally within the second jaw, and when actuated, the third arm pivots about the third pivot point and the second distal pivot point, and the fourth arm pivots about the fourth pivot point and the second distal pivot point such that the distal ends of the third and fourth distal arms move along a curved path proximally and outwardly relative to the central longitudinal axis of the leaflet resection device.

3. The leaflet resection device of claim 2, wherein the first linkage assembly is actuated by the actuator, and wherein the second linkage assembly is coupled to the first linkage assembly in a closed configuration of the leaflet resection device such that the second linkage assembly is actuated by the first linkage assembly.

4. The leaflet resection device of claim 2, wherein a distal end of the third distal arm of the second linkage assembly includes a slot configured to house a first tip of the first resection blade and a distal end of the fourth distal arm of the second linkage assembly includes a second slot configured to house a second tip of the second resection blade.

5. The leaflet resection device of claim 2, wherein a proximal end of the third proximal arm and a proximal end of the fourth proximal arm are rotatably coupled to the second jaw and longitudinally fixed relative to the second jaw.

6. The leaflet resection device of claim 5, wherein a proximal end of the first proximal arm and a proximal end of the second proximal arm are rotatably coupled to the first jaw and longitudinally fixed relative to the first jaw.

7. The leaflet resection device of claim 2, wherein a proximal end of the third proximal arm is rotatably coupled to a proximal end of the fourth proximal arm, and wherein the proximal ends of the first and second proximal arms are rotatably coupled to the second jaw and longitudinally fixed relative to the second jaw.

8. The leaflet resection device of claim 7, wherein a proximal end of the first proximal arm is rotatably coupled to a proximal end of the second proximal arm, and wherein the proximal ends of the first and second proximal arms are rotatably coupled to the first jaw and longitudinally fixed relative to the first jaw.

9. The leaflet resection device of claim 1, wherein the first jaw further includes a first protruding grip at the distal end of the first jaw and the second jaw further includes a second protruding grip at the distal end of the second jaw.

10. The leaflet resection device of claim 1, wherein the leaflet resection device includes an open configuration in which the first jaw and the second jaw are spaced apart from one another, and a closed configuration in which the first jaw and the second jaw are disposed adjacent to each other and substantially parallel to the central longitudinal axis of the leaflet resection device.

11. The leaflet resection device of claim 1, wherein the actuator includes a lead screw and a lead nut coupled to the lead screw, wherein rotation of the lead screw causes longitudinal translation of the lead nut, and wherein the lead nut is coupled to the first linkage assembly.

12. The leaflet resection device of claim 1, wherein the actuator is coupled to the first distal pivot point of the first linkage assembly such that actuation of the actuator longitudinally translates the first distal pivot point distally or proximally.

13. The leaflet resection device of claim 1, wherein a proximal end of the first proximal arm and a proximal end of the second proximal arm are rotatably coupled to the first jaw and longitudinally fixed relative to the first jaw.

14. The leaflet resection device of claim 1, wherein a proximal end of the first proximal arm is rotatably coupled to a proximal end of the second proximal arm, and wherein the proximal ends of the first and second proximal arms are rotatably coupled to the first jaw and longitudinally fixed relative to the first jaw.

15. The leaflet resection device of claim 1, wherein the leaflet resection device is configured to resect at least 50% of a leaflet.

16. The leaflet resection device of claim 1, wherein the leaflet resection device is configured to resect at least 60%, or at least 70%, or at least 80% of a leaflet.

17. A leaflet resection device having a central longitudinal axis, the leaflet resection device comprising:
- a first jaw, the first jaw including a distal end and a proximal end;
- a second jaw pivotably coupled to and opposing the first jaw, the second jaw including a distal end and a proximal end;
- a first linkage assembly coupled to the first jaw, the first linkage assembly including:
  - a first arm having a first proximal arm, a first distal arm, and a first pivot point pivotably coupling the first proximal arm and the first distal arm;
  - a second arm having a second proximal arm, a second distal arm, and a second pivot point pivotably coupling the second proximal arm and the second distal arm, wherein the first and second distal arms cross and are pivotably connected at a first distal pivot point distal of the first and second pivot points;
  - a first resection blade coupled to a distal end of the first distal arm and extending towards the second jaw; and
  - a second resection blade coupled to a distal end of the second distal arm and extending towards the second jaw; and
- an actuator coupled to the first linkage assembly;
- wherein the first jaw and the second jaw are configured to grasp a leaflet, and
- wherein with the leaflet grasped in the first and second jaws, the actuator is configured to move the first linkage assembly such that the first and second resection blades move in a curved path to resect at least 50% of the leaflet.

18. The leaflet resection device of claim 17, wherein the leaflet resection device is configured to resect at least 60%, or at least 70%, or at least 80% of a leaflet.

19. The leaflet resection device of claim 17, wherein in a delivery configuration, the first linkage assembly is elongated such that the first and second arms are disposed laterally within the first jaw, and when actuated by the actuator, the first arm pivots about the first pivot point and the first distal pivot point, and the second arm pivots about the second pivot point and the first distal pivot point such that the distal ends of the first and second distal arms move along a curved path proximally and outwardly relative to the central longitudinal axis of the leaflet resection device.

20. The leaflet resection device of claim 17, further comprising:
- a second linkage assembly coupled to the second jaw, the second linkage assembly including:
  - a third arm having a third proximal arm, a third distal arm, and a third pivot point pivotably coupling the third proximal arm and the third distal arm; and
  - a fourth arm having a fourth proximal arm, a fourth distal arm, and a fourth pivot point pivotably coupling the fourth proximal arm and the fourth distal arm, wherein the third and fourth distal arms cross and are pivotably connected at a second distal pivot point distal of the third and fourth pivot points;
- wherein in the delivery configuration, the second linkage assembly is elongated such that the third and fourth arms are disposed laterally within the second jaw, and when actuated, the third arm pivots about the third pivot point and the second distal pivot point, and the fourth arm pivots about the fourth pivot point and the second distal pivot point such that the distal ends of the third and fourth distal arms move along a curved path proximally and outwardly relative to the central longitudinal axis of the leaflet resection device.

* * * * *